(12) United States Patent
Bisaiji et al.

(10) Patent No.: US 8,820,054 B2
(45) Date of Patent: Sep. 2, 2014

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP); Kazuhiro Umemoto, Ebina (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 224 days.

(21) Appl. No.: 13/499,211

(22) PCT Filed: Jul. 14, 2011

(86) PCT No.: PCT/JP2011/066628
§ 371 (c)(1),
(2), (4) Date: Mar. 29, 2012

(87) PCT Pub. No.: WO2013/008342
PCT Pub. Date: Jan. 17, 2013

(65) Prior Publication Data
US 2013/0017121 A1 Jan. 17, 2013

(51) Int. Cl.
| | |
|---|---|
| *F01N 3/00* | (2006.01) |
| *F01N 3/10* | (2006.01) |
| *F01N 3/08* | (2006.01) |
| *F01N 11/00* | (2006.01) |
| *F01N 3/20* | (2006.01) |
| *F01N 13/00* | (2010.01) |
| *F01N 3/035* | (2006.01) |

(52) U.S. Cl.
CPC ............... *F01N 3/0871* (2013.01); *Y02T 10/47* (2013.01); *F01N 3/0814* (2013.01); *F01N 2900/1402* (2013.01); *F01N 2560/14* (2013.01); *F01N 2560/025* (2013.01); *F01N 2610/03* (2013.01); *F01N 2900/0418* (2013.01); *F01N 11/007* (2013.01); *F01N 3/2073* (2013.01); *F01N 13/009* (2014.06); *F01N 3/0842* (2013.01); *Y02C 20/10* (2013.01); *F01N 3/106* (2013.01); *F01N 3/035* (2013.01); *F01N 2550/05* (2013.01); *F01N 2240/30* (2013.01)
USPC ................... 60/286; 60/276; 60/301; 60/303

(58) Field of Classification Search
CPC ... F01N 3/0814; F01N 3/0842; F01N 3/0871; F01N 11/007; F01N 2550/05; F01N 2560/025; F01N 2560/14; F01N 2610/03
USPC .................................. 60/276, 286, 301, 303
See application file for complete search history.

(56) References Cited

U.S. PATENT DOCUMENTS

| | | | |
|---|---|---|---|
| 2004/0050037 A1 | | 3/2004 | Betta et al. |
| 2008/0053073 A1 | * | 3/2008 | Kalyanaraman et al. ....... 60/286 |

(Continued)

FOREIGN PATENT DOCUMENTS

| | | | | |
|---|---|---|---|---|
| JP | 2004308526 A | * | 11/2004 | .............. F02D 45/00 |
| JP | A-2004-316458 | | 11/2004 | |

(Continued)

OTHER PUBLICATIONS
International Search Report issued in International Application No. PCT/JP2011/066628 dated Sep. 13, 2011 (with Translation).

(Continued)

*Primary Examiner* — Audrey K Bradley
(74) *Attorney, Agent, or Firm* — Oliff PLC

(57) ABSTRACT

In an internal combustion engine, inside of an engine exhaust passage, an upstream side air-fuel ratio sensor (23), a hydrocarbon feed valve (15), an exhaust purification catalyst (13), and a downstream side air-fuel ratio sensor (24) are arranged in this order from the upstream. At the time of engine operation, the injection amount of hydrocarbons from the hydrocarbon feed valve (15) is controlled based on the air-fuel ratio detected by the upstream side air-fuel ratio sensor (23) and the downstream side air-fuel ratio sensor (24) so that the amplitude of change of the concentration of hydrocarbons which flow into the exhaust purification catalyst (13) becomes within a predetermined range of amplitude.

14 Claims, 28 Drawing Sheets

(56) References Cited

U.S. PATENT DOCUMENTS

| | | | |
|---|---|---|---|
| 2009/0000277 A1* | 1/2009 | Yoshida et al. | 60/286 |
| 2009/0049824 A1* | 2/2009 | Kojima et al. | 60/285 |
| 2009/0049826 A1* | 2/2009 | Toshioka et al. | 60/286 |
| 2009/0229251 A1 | 9/2009 | Kadowaki | |

FOREIGN PATENT DOCUMENTS

| | | | |
|---|---|---|---|
| JP | A-2005-113801 | 4/2005 | |
| JP | A-2008-002451 | 1/2008 | |
| JP | 2008231926 A * | 10/2008 | F01N 3/08 |
| JP | A-2009-168031 | 7/2009 | |
| JP | A-2009-221939 | 10/2009 | |

OTHER PUBLICATIONS

U.S. Appl. No. 13/502,210, filed on Apr. 16, 2012, in the name of Bisaiji.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_X$ storage catalyst which stores $NO_X$ which is contained in exhaust gas when the air-fuel ratio of the inflowing exhaust gas is lean and which releases the stored $NO_X$ when the air-fuel ratio of the inflowing exhaust gas becomes rich, which arranges a fuel addition valve in the engine exhaust passage upstream of the $NO_X$ storage catalyst, which arranges an air-fuel ratio sensor inside the engine exhaust passage downstream of the $NO_X$ storage catalyst, and which feeds fuel from the fuel addition valve to the inside of the engine exhaust passage to make the air-fuel ratio of the exhaust gas flowing into the $NO_X$ storage catalyst rich when $NO_X$ should be released from the $NO_X$ storage catalyst (for example, see Patent Literature 1).

In this regard, in this internal combustion engine, for example, if the fuel addition valve becomes clogged, the amount of fuel feed when feeding fuel from the fuel addition valve to release $NO_X$ becomes smaller compared with the amount of fuel feed when the fuel addition valve is not clogged. As a result, at this time, the air-fuel ratio of the exhaust gas which flows out from the $NO_X$ storage catalyst becomes the lean side compared with the air-fuel ratio when the fuel addition valve is not clogged. Therefore, in this internal combustion engine, the air-fuel ratio of the exhaust gas when fuel is fed from the fuel addition valve for release of $NO_X$ is detected by the air-fuel ratio sensor. When the air-fuel ratio of the exhaust gas which is detected by the air-fuel ratio sensor becomes the lean side compared with the air-fuel ratio when the fuel addition valve is not clogged, it is judged that there is an abnormality in the fuel addition valve.

CITATIONS LIST

Patent Literature

Patent Literature 1: Japanese Patent Publication (A) No. 2009-221939

SUMMARY OF INVENTION

Technical Problem

However, if this $NO_X$ storage catalyst becomes a high temperature, the $NO_X$ purification rate ends up falling. Therefore, there is the problem that if the $NO_X$ storage catalyst becomes a high temperature, a high $NO_X$ purification rate cannot be obtained.

An object of the present invention is to provide an exhaust purification system of an internal combustion engine which can give a high $NO_X$ purification rate even when the exhaust purification catalyst becomes a high temperature.

Solution to Problem

According to the present invention, there is provided an exhaust purification system of an internal combustion engine in which a hydrocarbon feed valve for feeding hydrocarbons is arranged in an engine exhaust passage, an exhaust purification catalyst for reacting $NO_X$ contained in exhaust gas and reformed hydrocarbons is arranged in the engine exhaust passage downstream of the hydrocarbon feed valve, a downstream side air-fuel ratio sensor for detecting an air-fuel ratio of the exhaust gas is arranged in the engine exhaust passage downstream of the exhaust purification catalyst, precious metal catalysts are carried on an exhaust gas flow surface of the exhaust purification catalyst and a basic exhaust gas flow surface part is formed around the precious metal catalysts, the exhaust purification catalyst has a property of reducing the $NO_X$ which is contained in exhaust gas if a concentration of hydrocarbons which flow into the exhaust purification catalyst is made to vibrate by within a predetermined range of amplitude and within a predetermined range of period and has a property of being increased in storage amount of $NO_X$ which is contained in exhaust gas if the vibration period of the hydrocarbon concentration is made longer than the predetermined range, at the time of engine operation, the concentration of hydrocarbons which flow into the exhaust purification catalyst is made to vibrate with the predetermined range of period by control of an injection period of hydrocarbons from the hydrocarbon feed valve, and the amplitude of the change of concentration of hydrocarbons which flow into the exhaust purification catalyst is made to become within the predetermined range of amplitude by control of an injection amount of hydrocarbons from the hydrocarbon feed valve based on an output signal of the downstream side air-fuel ratio sensor.

Advantageous Effects of Invention

It is possible to obtain a high $NO_X$ purification rate even if the exhaust purification catalyst becomes a high temperature.

DESCRIPTION OF EMBODIMENTS

Figure 1:
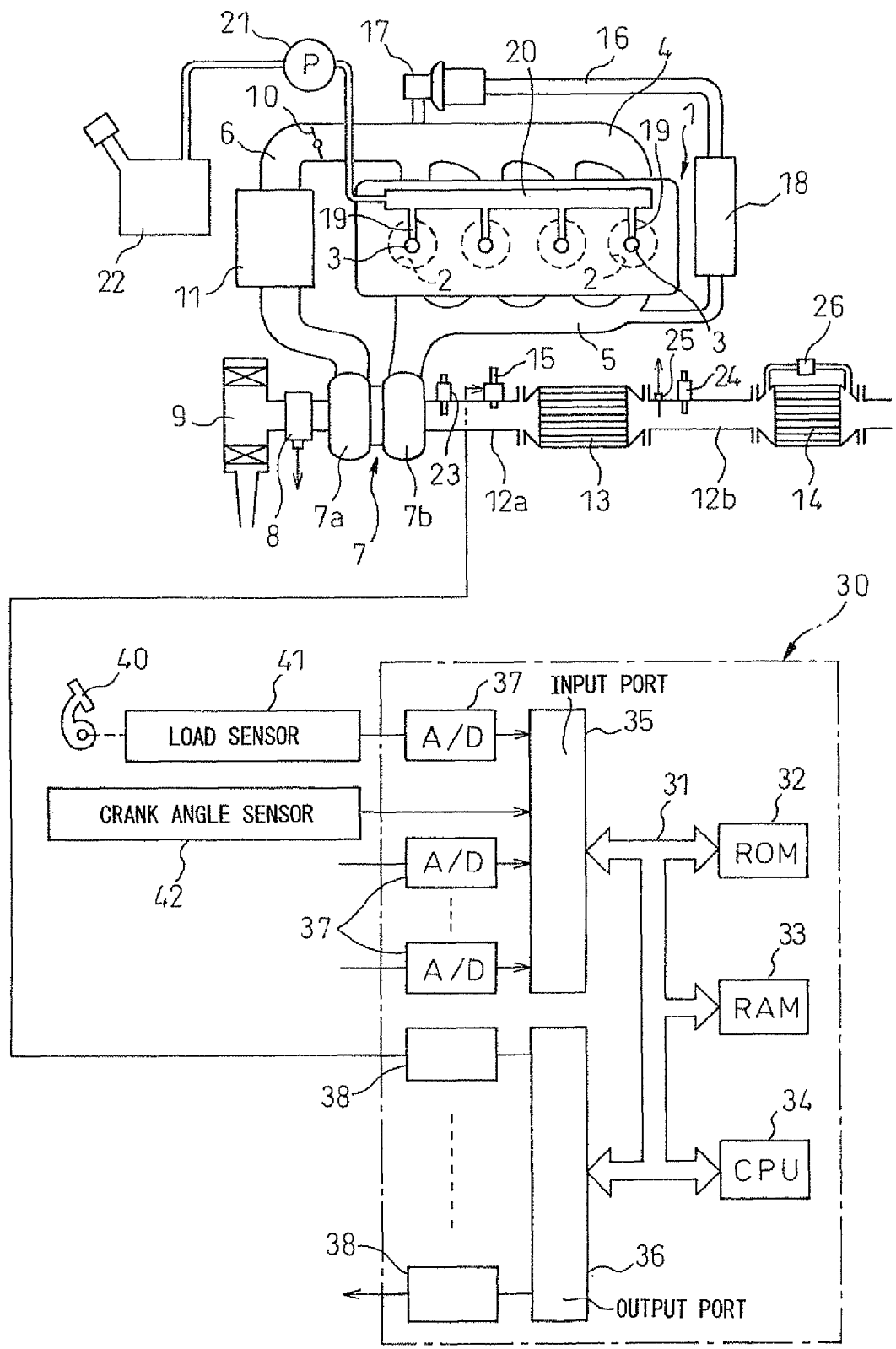
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12a to an inlet of the exhaust purification catalyst 13, while an outlet of the exhaust purification catalyst 13 is connected through an exhaust pipe 12b to a particulate filter 14 for trapping particulate which is contained in exhaust gas.

Inside the exhaust pipe 12a upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided a ROM (read only memory) 32, a RAM (random access memory) 33, a CPU (microprocessor) 34, an input port 35, and an output port 36, which are connected with each other by a bidirectional bus 31. Inside of the exhaust pipe 12a upstream of the hydrocarbon feed valve 15, an upstream side air-fuel ratio sensor 23 for detecting an air-fuel ratio of the exhaust gas which is exhausted from the engine is arranged, while inside of the exhaust pipe 12b downstream of the exhaust purification catalyst 13, a downstream side air-fuel ratio sensor 24 is arranged for detecting an air-fuel ratio of the exhaust gas which flows out from the exhaust purification catalyst 13. Further, downstream of the exhaust purification catalyst 13, a temperature sensor 24 is arranged for detecting the temperature of the exhaust purification catalyst 13, while at the particulate filter 14, a differential pressure sensor 26 is attached for detecting a differential pressure before and after the particulate filter 14. The output signals of these upstream side air-fuel ratio sensor 23, downstream side air-fuel ratio sensor 24, temperature sensor 25, differential pressure sensor 26, and intake air amount detector 8 are input through respectively corresponding AD converters 37 to the input port 35.

Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
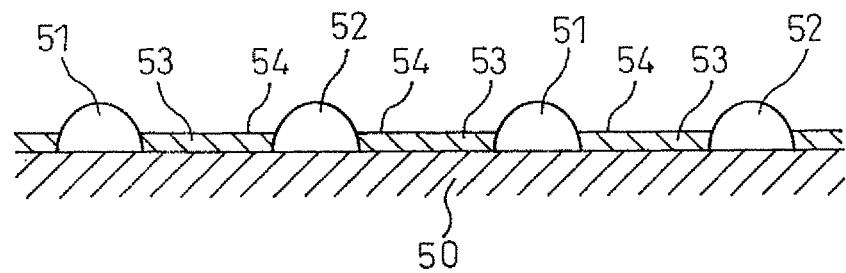
FIG. 2 is a view which schematically shows a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_X$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
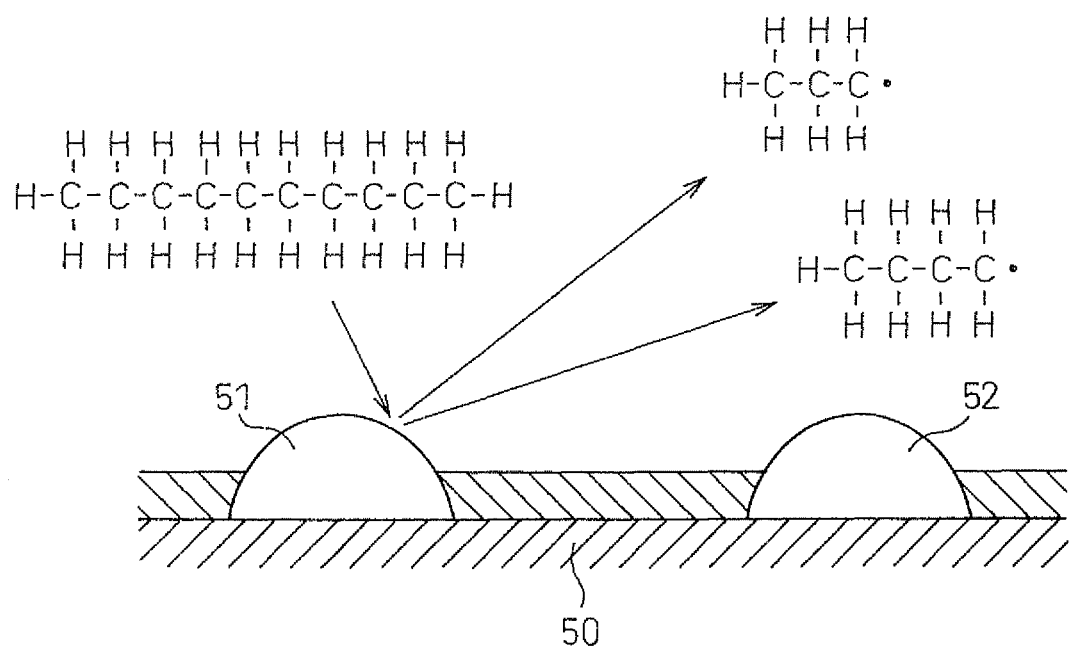
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
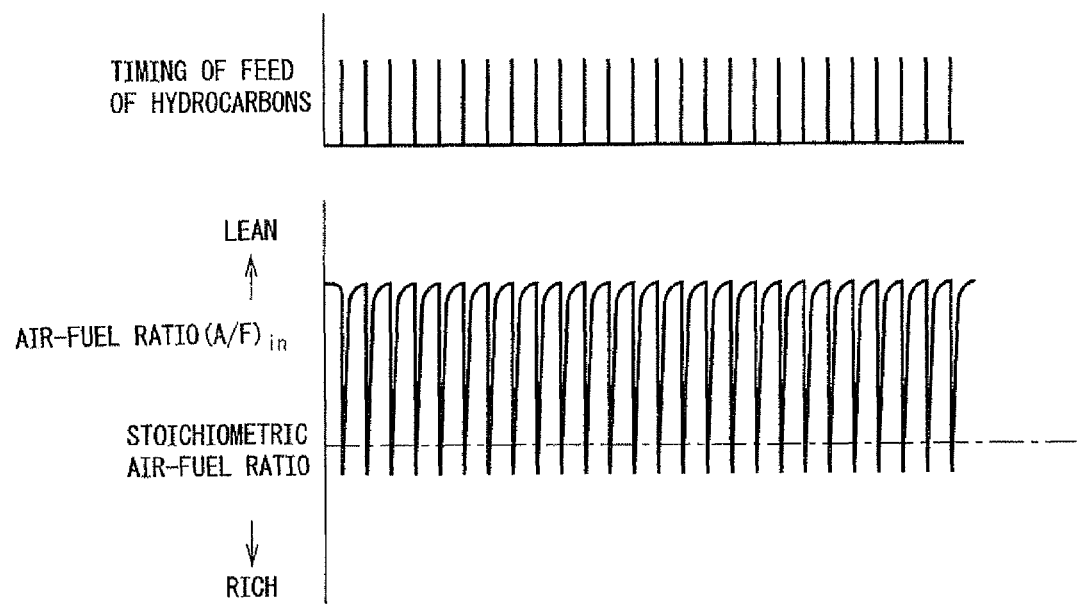
FIG. 4 is a view which shows a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
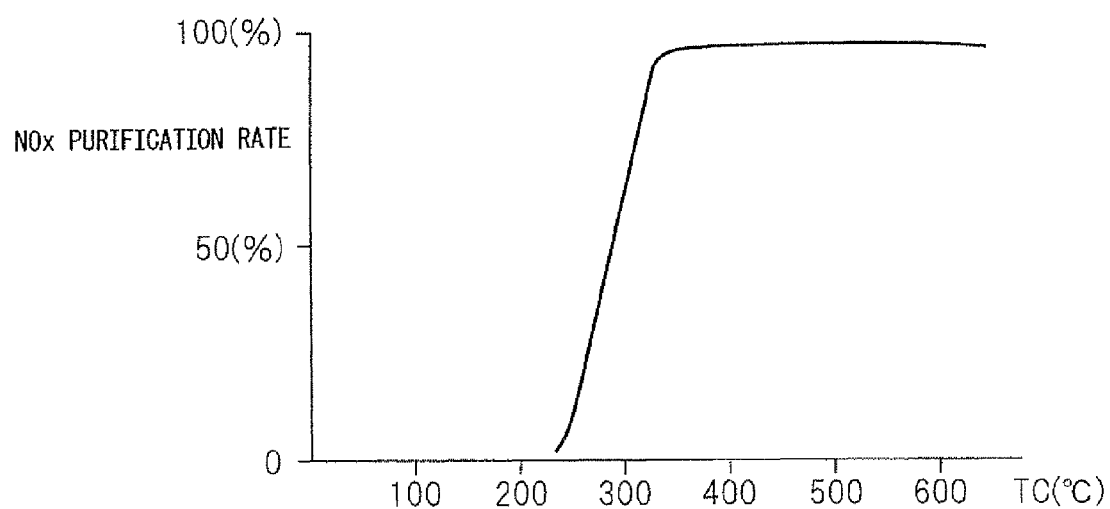
FIG. 5 is a view which shows an $NO_X$ purification rate.

FIG. 5 shows the $NO_X$ purification rate by the exhaust purification catalyst 13 with respect to the catalyst temperatures of the exhaust purification catalyst 13 when periodically making the concentration of hydrocarbons which flow into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_X$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate is obtained even in a 400° C. or higher high temperature region.

Figure 6A:
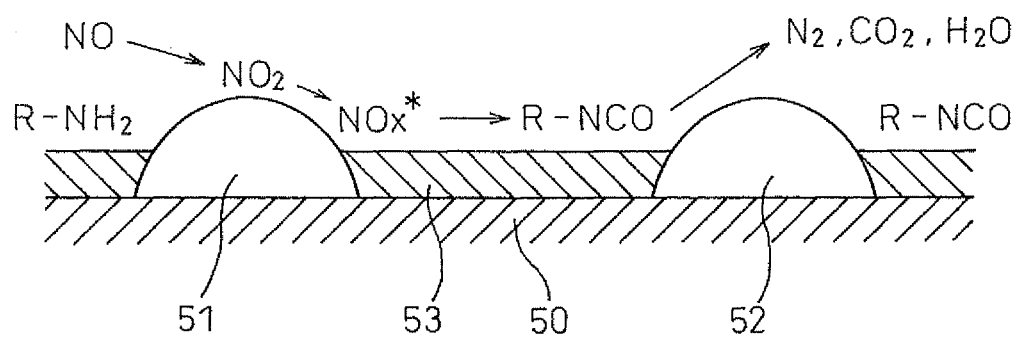
FIGS. 6A and 6B are views for explaining an oxidation reduction reaction in an exhaust purification catalyst.
Figure 6B:
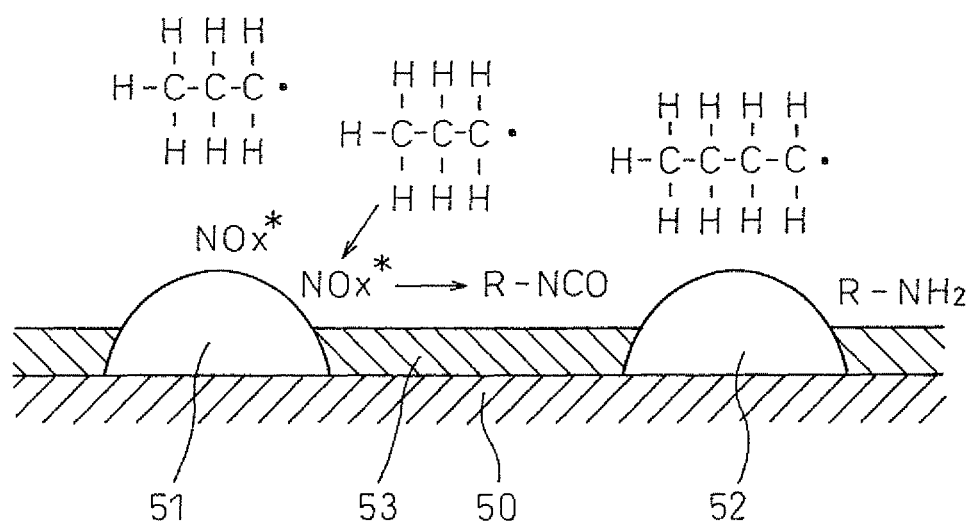

Furthermore, at this time, a large amount of reducing intermediate which contains nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_X$ purification rate. Next, this will be explained with reference to FIGS. 6A and 68. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_X^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediate. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—NH$_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons which flow into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_X^*$ react. At this time, the active $NO_X^*$ reacts with the reducing intermediate R—NCO or R—NH$_2$ to become $N_2$, $CO_2$, $H_2O$, therefore the $NO_X$ is removed.

In this way, in the exhaust purification catalyst 13, by making the concentration of hydrocarbons which flow into the exhaust purification catalyst 13 higher, a reducing intermediate is produced. The concentration of hydrocarbons which flow into the exhaust purification catalyst 13 is lowered and the oxygen concentration is raised so that the active $NO_X^*$ reacts with the reducing intermediate and the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_X^*$. That is, it is necessary to make the concentration of hydrocarbons which flow into the exhaust purification catalyst 13 vibrate by within a predetermined range of amplitude. Note that, in this case, it is necessary to hold a sufficient amount of reducing intermediate R—NCO or R—NH$_2$ on the basic layer 53, that is, the basic exhaust gas flow surface part 24, until the produced reducing intermediate reacts with the active $NO_X^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_X^*$ is absorbed in the basic layer 53 in the form of nitrates without producing a reducing intermediate. To avoid this, it is necessary to make the concentration of hydrocarbons which flow into the exhaust purification catalyst 13 vibrate by within a predetermined range of period.

Therefore, in an embodiment of the present invention, to make the $NO_X$ contained in the exhaust gas and the reformed hydrocarbons react and produce the reducing intermediate R—NCO or R—NH$_2$ containing nitrogen and hydrocarbons, the precious metal catalysts 51 and 52 are carried on the exhaust gas flow surface of the exhaust purification catalyst 13. To hold the produced reducing intermediate R—NCO or R—NH$_2$ inside the exhaust purification catalyst 13, a basic exhaust gas flow surface part 54 is formed around the precious metal catalysts 51 and 52. NO is reduced by the reducing action of the reducing intermediate R—NCO or R—NH$_2$ held on the basic exhaust gas flow surface part 54, and the vibration period of the hydrocarbon concentration is made the vibration period required for continuation of the production of the reducing intermediate R—NCO or R—NH$_2$. Incidentally, in the example shown in FIG. 4, the injection interval is made 3 seconds.

Figure 7A:
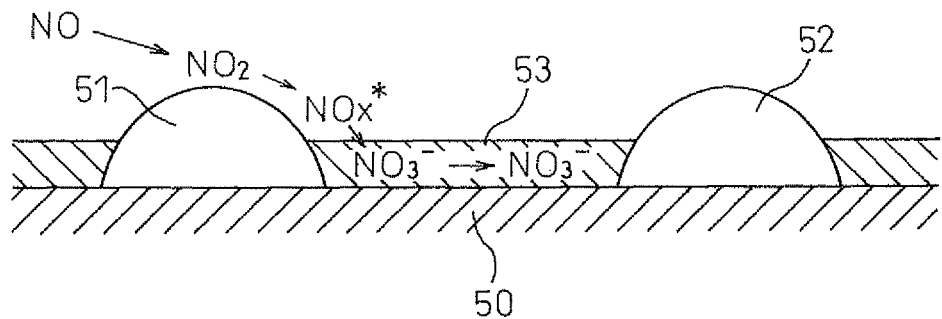
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—NH$_2$ disappears from the surface of the basic layer 53. At this time, the active $NO_X^*$ which is produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
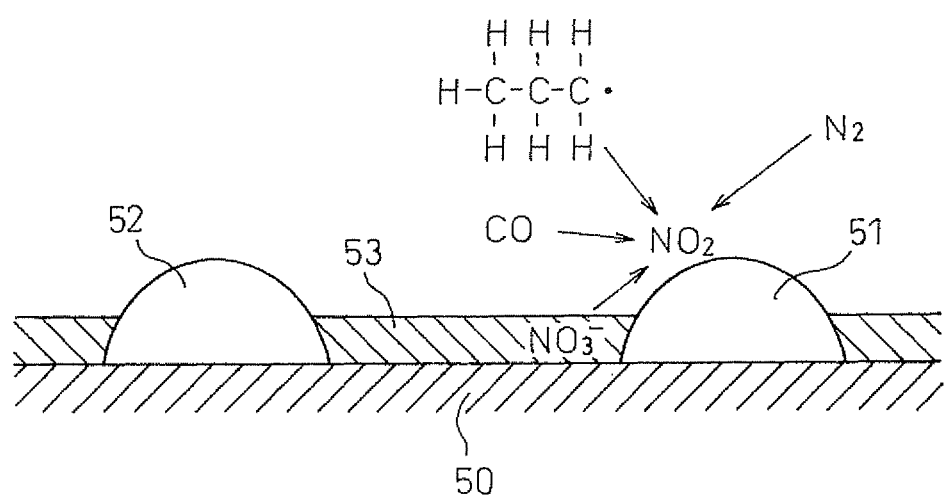

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
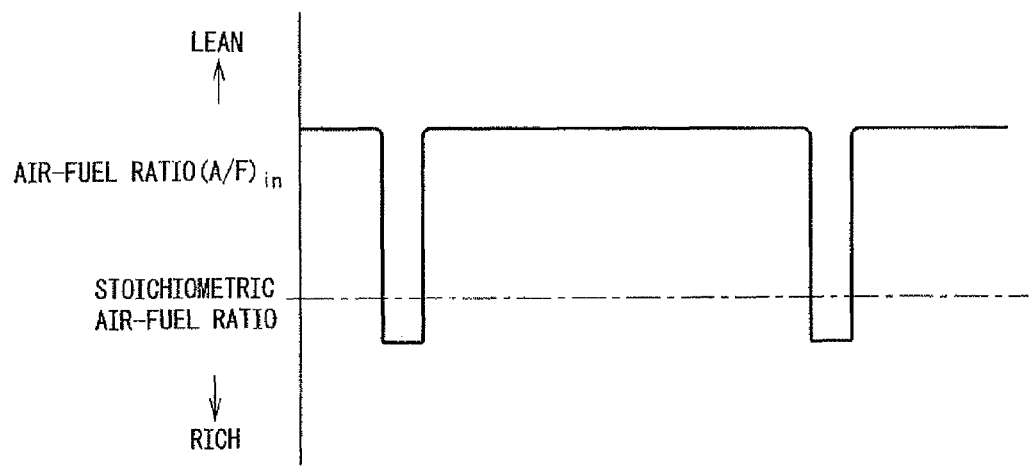
FIG. 8 is a view which shows a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of storage as a term including both absorption and adsorption, at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and exhaust passage upstream of the exhaust purification catalyst 13 is called the air-fuel ratio of the exhaust gas, the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 9:
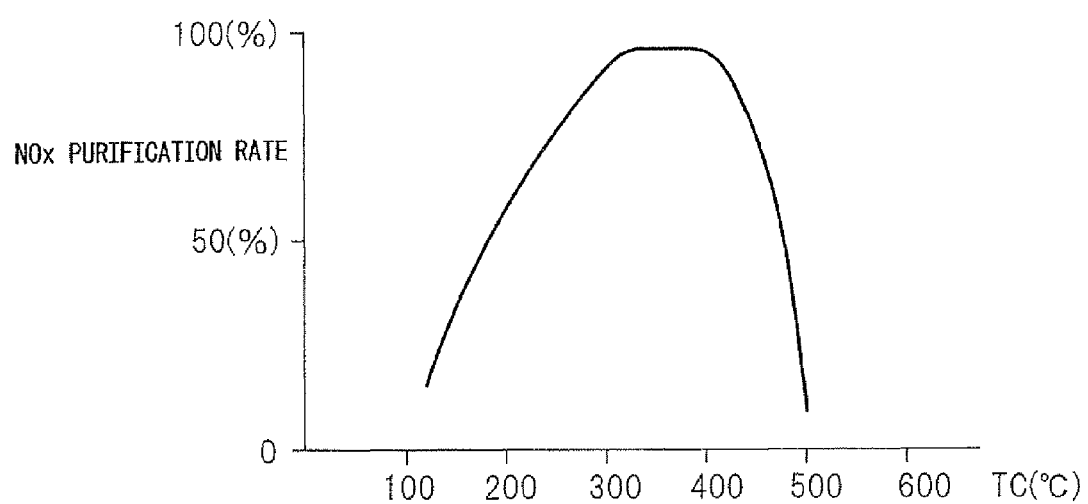
FIG. 9 is a view of an $NO_X$ purification rate.

FIG. 9 shows the $NO_X$ purification rate when making the exhaust purification catalyst 13 function as an $NO_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown in FIG. 9, when the catalyst temperature TC is 300° C. to 400° C., an extremely high $NO_X$ purification rate is obtained, but when the catalyst temperature TC becomes a 400° C. or higher high temperature, the $NO_X$ purification rate falls.

In this way, when the catalyst temperature TC becomes 400° C. or more, the $NO_X$ purification rate falls because if the catalyst temperature TO becomes 400° C. or more, the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate. However, in the new $NO_X$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TO is high, a high $NO_X$ purification rate is obtained.

Therefore, in the present invention, a hydrocarbon feed valve 15 for feeding hydrocarbons is arranged inside of an engine exhaust passage, downstream of the hydrocarbon feed valve 15 inside of the engine exhaust passage, an exhaust purification catalyst 13 for reacting $NO_X$ contained in exhaust gas and reformed hydrocarbons is arranged downstream of the hydrocarbon feed valve 15 in the engine exhaust passage, precious metal catalysts 51 and 52 are carried on the exhaust gas flow surface of the exhaust purification catalyst 13, a basic exhaust gas flow surface part 54 is formed around the precious metal catalysts 51 and 52, the exhaust purification catalyst 13 has the property of reducing the $NO_X$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the concentration of hydrocarbons which flow into the exhaust purification catalyst 13 is made to vibrate by within the predetermined range of amplitude and with the predetermined range of period to thereby reduce the $NO_X$ which is contained in the exhaust gas in the exhaust purification catalyst 13.

That is, the $NO_X$ purification method which is shown from FIG. 4 to FIGS. 6A and 6B can be said to be a new $NO_X$ purification method designed to remove $NO_X$ without forming almost any nitrates in the case of using an exhaust purification catalyst which carries precious metal catalysts and forms a basic layer which can absorb $NO_X$. In actuality, when using this new $NO_X$ purification method, the nitrates which are detected from the basic layer 53 become much smaller in amount compared with the case where making the exhaust purification catalyst 13 function as an $NO_X$ storage catalyst. Note that, this new $NO_X$ purification method will be referred to below as the first $NO_X$ purification method.

Next, referring to FIG. 10 to FIG. 15, this first $NO_X$ purification method will be explained in a bit more detail.

Figure 10:
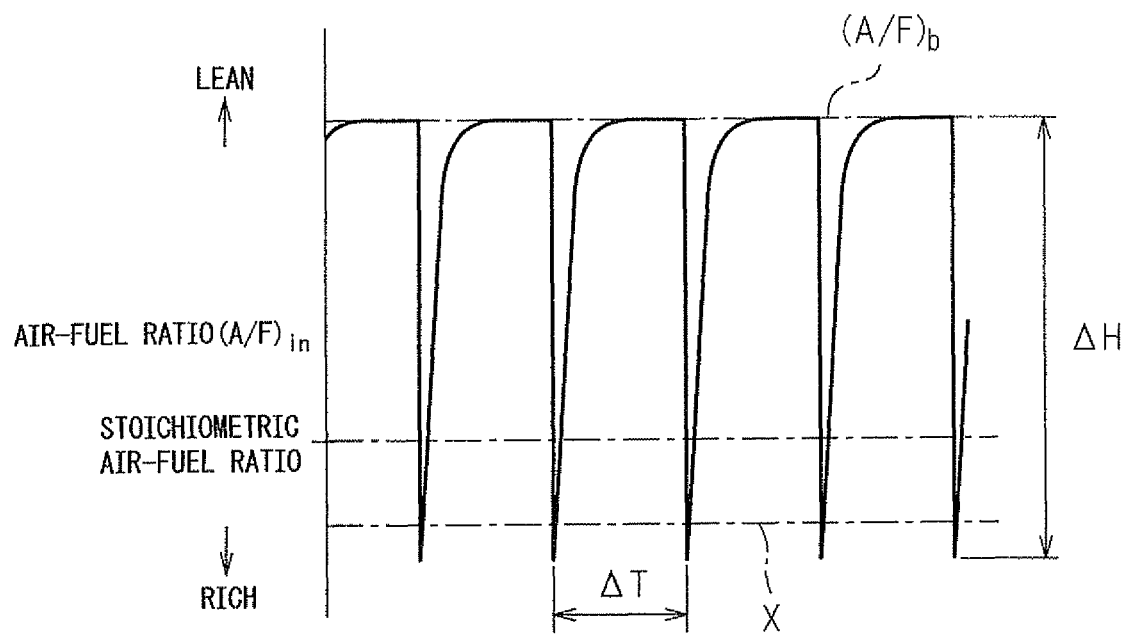
FIG. 10 is a time chart which shows a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas which flows into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in used for producing the reducing intermediate without the produced active $NO_X^*$ being stored in the form of nitrates inside the basic layer 53 much at all. To make the active $NO_X^*$ and the reformed hydrocarbons react to produce a reducing intermediate, the air-fuel ratio (A/F)in has to be made lower than this upper limit X of the air-fuel ratio.

In other words, in FIG. 10, X shows the lower limit of the concentration of hydrocarbons required for making the active $NO_X^*$ and reformed hydrocarbons react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_X^*$, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
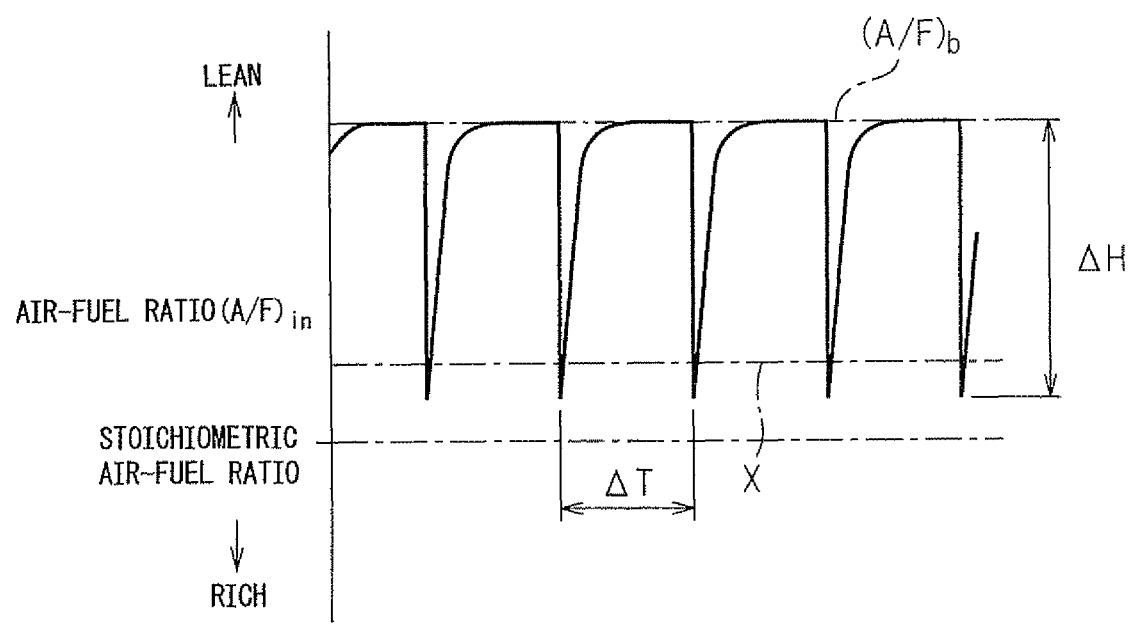
FIG. 11 is a time chart which shows a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, a reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, part of the hydrocarbons will not be completely oxidized, but will be partially oxidized, that is, the hydrocarbons will be reformed, consequently a reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, part of the hydrocarbons will not be completely oxidized, but will be partially oxidized, that is, the hydrocarbons will be reformed, and consequently a reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
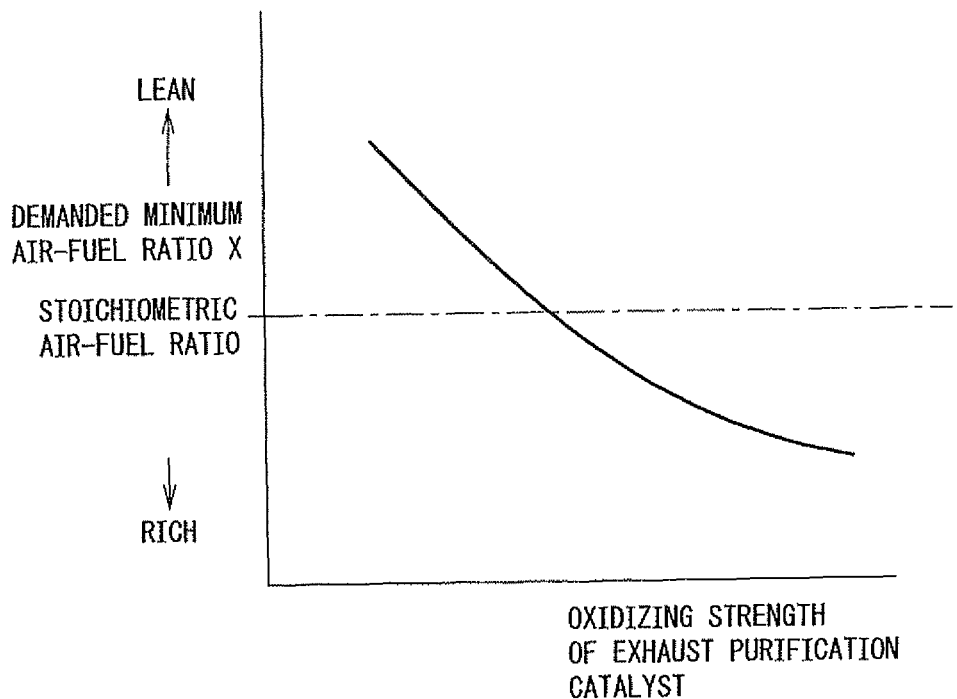
FIG. 12 is a view which shows a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which do not contribute to the production of the reducing intermediate also increases. In this case, to remove the $NO_X$ well, as explained above, it is necessary to make the excess hydrocarbons oxidize. Therefore, to remove the $NO_X$ well, the larger the amount of excess hydrocarbons, the larger the amount of oxygen which is required.

In this case, if raising the oxygen concentration in the exhaust gas, the amount of oxygen can be increased. Therefore, to remove the $NO_X$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
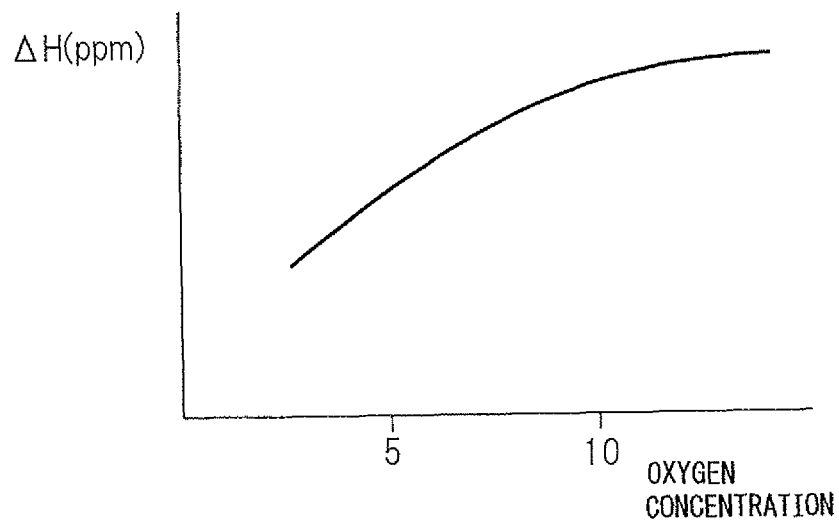
FIG. 13 is a view which shows a relationship between an oxygen concentration in exhaust gas and an amplitude ΔH of a hydrocarbon concentration giving the same $NO_X$ purification rate.

FIG. 13 shows the relationship between the oxygen concentration in the exhaust gas before the hydrocarbons are fed and the amplitude $\Delta H$ of the hydrocarbon concentration when the same $NO_X$ purification rate is obtained. To obtain the same $NO_X$ purification rate, from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_X$ purification rate, the higher the base air-fuel ratio (A/F)b, the greater the amplitude $\Delta T$ of the hydrocarbon concentration has to be made. In other words, to remove the $NO_X$ well, the lower the base air-fuel ratio (A/F)b, the more the amplitude $\Delta T$ of the hydrocarbon concentration can be reduced.

Figure 14:
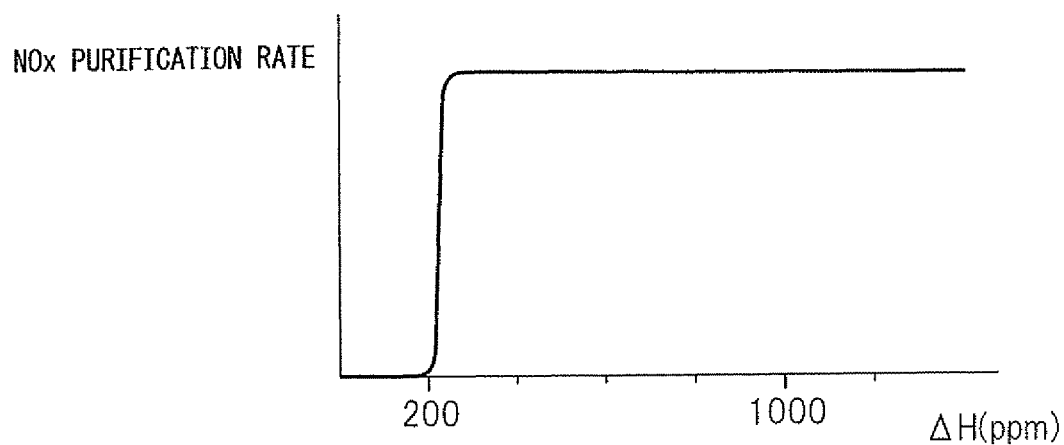
FIG. 14 is a view which shows a relationship between an amplitude ΔH of a hydrocarbon concentration and an $NO_X$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_X$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_X$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_X$ purification rate is obtained. Therefore, in the present invention, the predetermined range of the amplitude of the hydrocarbon concentration is made 200 ppm to 10000 ppm.

Figure 15:
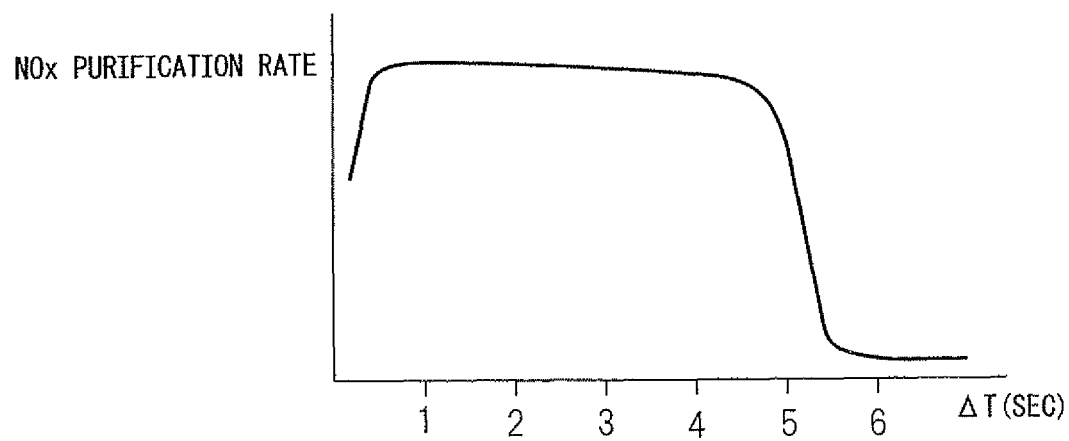
FIG. 15 is a view which shows a relationship of a vibration period ΔT of a hydrocarbon concentration and an $NO_X$ purification rate.

Further, if the vibration period $\Delta T$ of the hydrocarbon concentration becomes longer, the oxygen concentration around the active $NO_X^*$ becomes higher in the time period after the hydrocarbons are fed to when the hydrocarbons are next fed. In this case, if the vibration period $\Delta T$ of the hydrocarbon concentration becomes longer than about 5 seconds, the majority of the active $NO_X^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_X$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_X$ purification rate falls. Therefore, in the present invention, the vibration period of the hydrocarbon concentration is made from 0.3 second to 5 seconds.

Next, referring to FIG. 16 to FIG. 19, an $NO_X$ purification method in the case when making the exhaust purification catalyst 13 function as an $NO_X$ storage catalyst will be explained in detail. The $NO_X$ purification method in the case when making the exhaust purification catalyst 13 function as an $NO_X$ storage catalyst in this way will be referred to below as the second $NO_X$ purification method.

Figure 16:
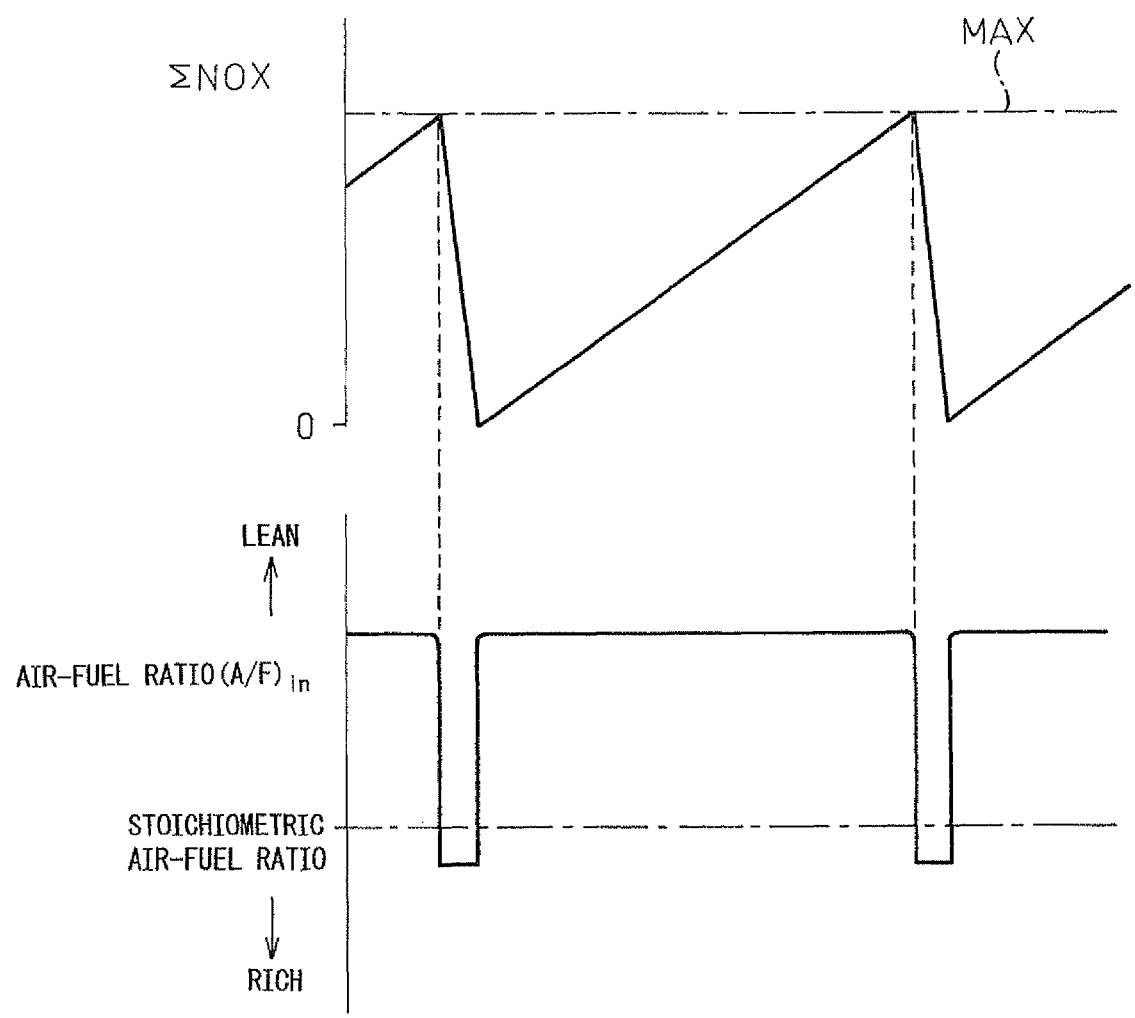
FIG. 16 is a view which shows a change in the air-fuel ratio of the exhaust gas flowing to the exhaust purification catalyst etc.

In this second $NO_X$ purification method, as shown in FIG. 16, when the stored $NO_X$ amount $\Sigma NOX$ of $NO_X$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_X$ which was stored in the basic layer 53 when the air-fuel ratio (A/F)in of the exhaust gas was lean is released from the basic layer 53 all at once and reduced. Due to this, the $NO_X$ is removed.

Figure 17:
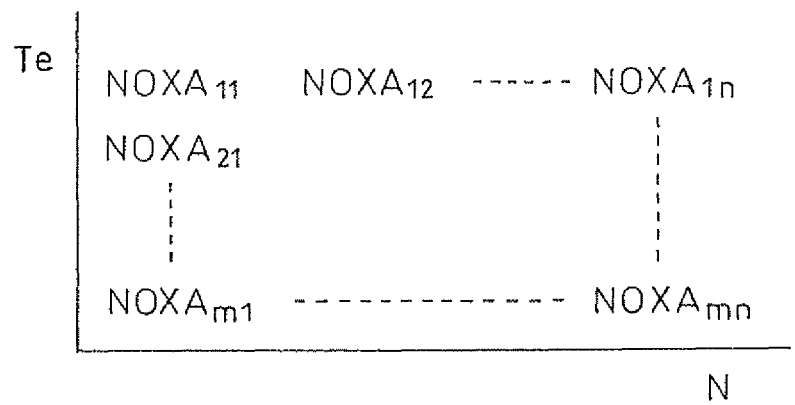
FIG. 17 is a view which shows a map of an exhausted $NO_X$ amount NOXA.

The stored $NO_X$ amount $\Sigma NOX$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the engine output torque Te and engine speed N in the form of a map such as shown in FIG. 17 in advance in the ROM 32. The stored $NO_X$ amount $\Sigma NOX$ is calculated from the exhausted $NO_X$ amount NOXA. In this case, as explained before, the period during which the air-fuel ratio (A/F)in of the exhaust gas is made rich is usually 1 minute or more.

Figure 18:
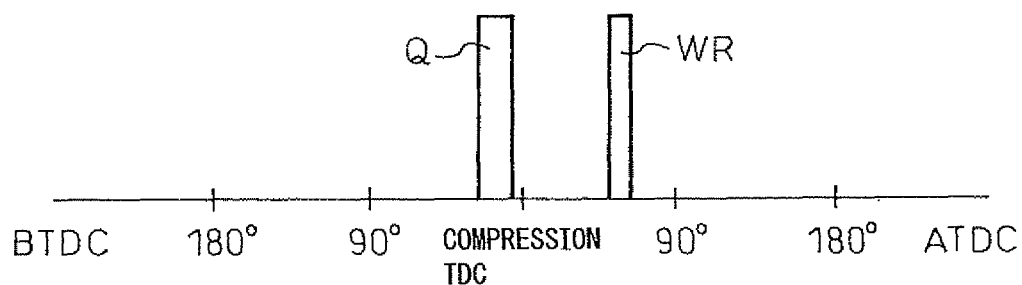
FIG. 18 is a view which shows a fuel injection timing.
Figure 19:
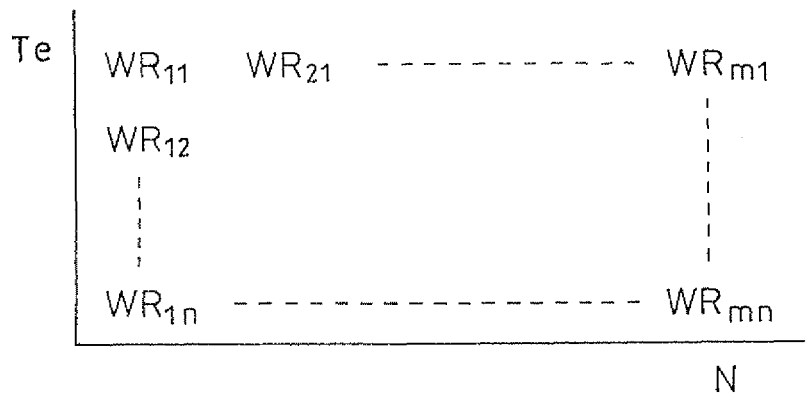
FIG. 19 is a view which shows a map of an additional fuel amount WR.

In this second $NO_X$ purification method, as shown in FIG. 18, the fuel injector 3 injects additional fuel WR into the combustion chamber 2 in addition to the output generation-use fuel Q so that the air-fuel ratio (A/F)in of the exhaust gas which flows into the exhaust purification catalyst 13 is made rich. Note that, in FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the engine output torque Te and engine speed N in the form of a map such as shown in FIG. 19 in advance in the ROM 32. Of course, in this case, it is also possible to make the feed amount of hydrocarbons from the hydrocarbon feed valve 15 increase so as to make the air-fuel ratio (A/F)in of the exhaust gas rich.

Now, returning again to the explanation of the first $NO_X$ purification method, to use the first $NO_X$ purification method to remove the $NO_X$ well as explained before, the amplitude $\Delta H$ and vibration period $\Delta T$ of the hydrocarbon concentration have to be suitably controlled. That is, to use the first $NO_X$ purification method to remove the $NO_X$ well, it is necessary to control the amplitude $\Delta H$ of the hydrocarbon concentration so that the air-fuel ratio (A/F)in of the exhaust gas which flows into the exhaust purification catalyst 13 becomes the demanded minimum air-fuel ratio X or less, and it is necessary to control the vibration period ΔT of the hydrocarbon concentration to 0.3 second to 5 seconds.

In this case, in the present invention, the amplitude ΔH of the hydrocarbon concentration is controlled by controlling the injection amount of hydrocarbons from the hydrocarbon feed valve 15 and the vibration period ΔT of the hydrocarbon concentration is controlled by controlling the injection period of hydrocarbons from the hydrocarbon feed valve 15. In this case, the injection amount of hydrocarbons from the hydrocarbon feed valve 15 can be controlled by controlling at least one of the injection time or injection pressure of hydrocarbons from the hydrocarbon feed valve 15. However, below, the present invention will be explained with reference to the case of controlling the injection amount by controlling the injection time while holding the injection pressure constant.

Figure 20A:
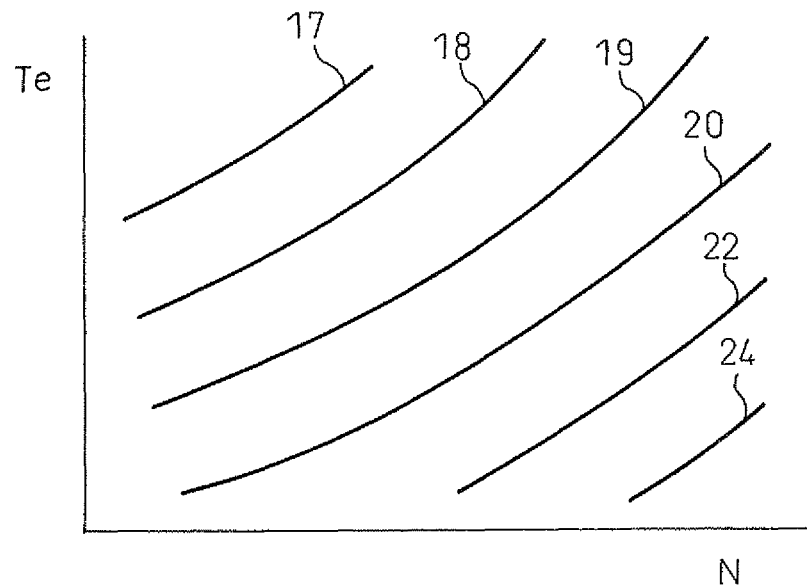
FIGS. 20A and 20B are views which show a target base air-fuel ratio.

Now then, in this embodiment according to the present invention, the optimal opening degree of the throttle valve 10 and the optimal opening degree of the EGR control valve 17 in accordance with the operating state of the engine are found in advance by experiments. Furthermore, the optimal base air-fuel ratio (A/F)b which is obtained when the throttle valve 10 and the EGR control valve 17 are made the optimal opening degrees is also found in advance by experiments. FIG. 20A shows the optimal base air-fuel ratio (A/F)b which is found by experiments as a function of the engine speed N and engine output torque Te. Note that, the solid lines in FIG. 20A express the equivalent air-fuel ratio lines of the air-fuel ratios shown by the numerical values.

Figure 20B:
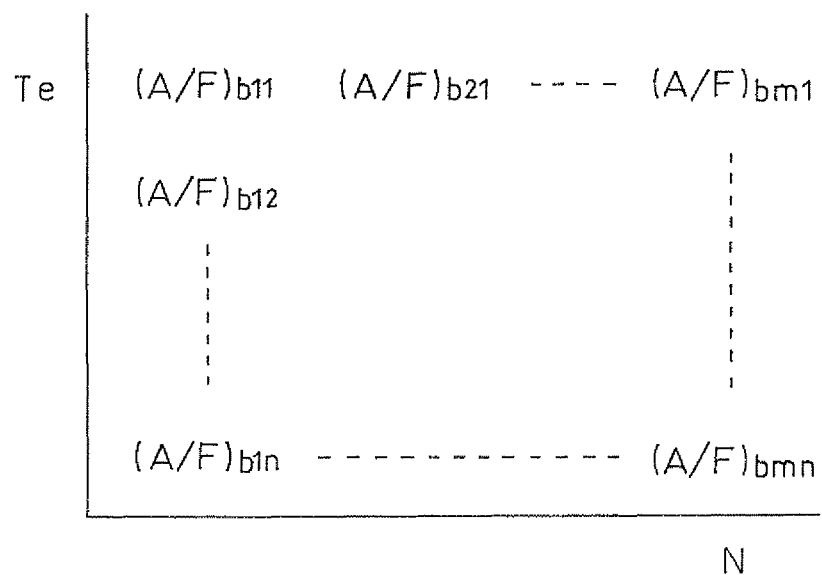

At the time of engine operation, the fuel injection amount from the fuel injector 3 is controlled so that the air-fuel ratio of the exhaust gas which is exhausted from the engine becomes the optimal base air-fuel ratio (A/F)b which is shown in FIG. 20A. Note that, the optimal base air-fuel ratio (A/F)b which is shown in FIG. 20A is stored as a function of the engine speed N and engine output torque Te in the form of a map such as shown in FIG. 20B in advance in the ROM 32.

Figure 21A:
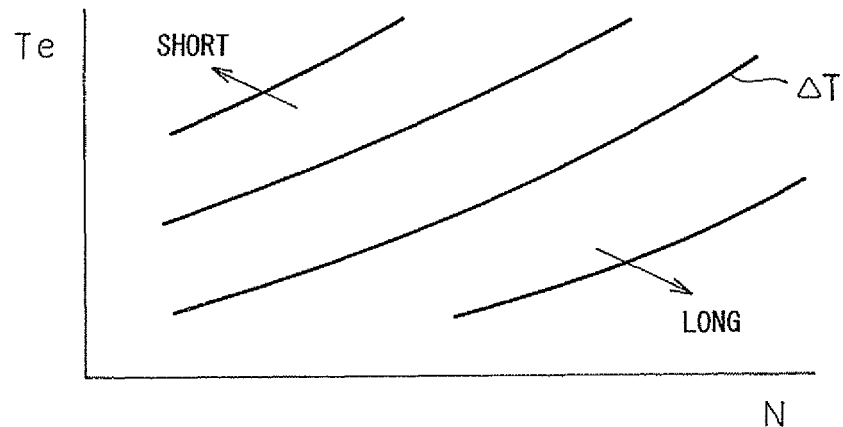
FIGS. 21A, 21B, and 21C are views which show an injection period of hydrocarbons etc.

Further, the optimal hydrocarbon injection period ΔT and the optimal hydrocarbon injection period NT which give the highest $NO_X$ purification rate when the $NO_X$ purification action is performed by the first $NO_X$ purification method are found in advance by experiments. FIG. 21A shows the optimal hydrocarbon injection period ΔT which is found by experiments as a function of the engine speed N and the engine output torque Te. Note that, the solid lines in FIG. 21A show the equivalent hydrocarbon injection periods. As will be understood from FIG. 21A, the optimal hydrocarbon injection period ΔT becomes shorter the lower the engine speed N and becomes shorter the higher the engine output torque Te.

Figure 21B:
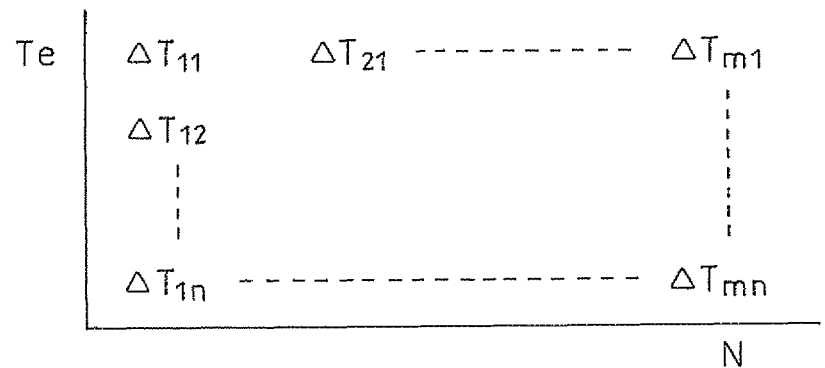

The optimal hydrocarbon injection period ΔT which is shown in FIG. 21A is stored as a function of the engine speed N and the engine output torque Te in the form of a map such as shown in FIG. 21B in advance in the ROM 32. Further, the optimal hydrocarbon injection period WT which is found by experiments is also stored as a function of the engine speed N and engine output torque Te in the form of a map such as shown in FIG. 20C in advance in the ROM 32.

Figure 21C:
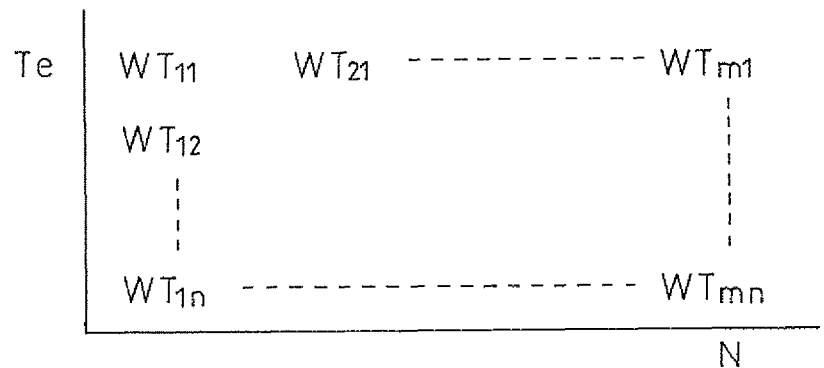
Figure 22A:
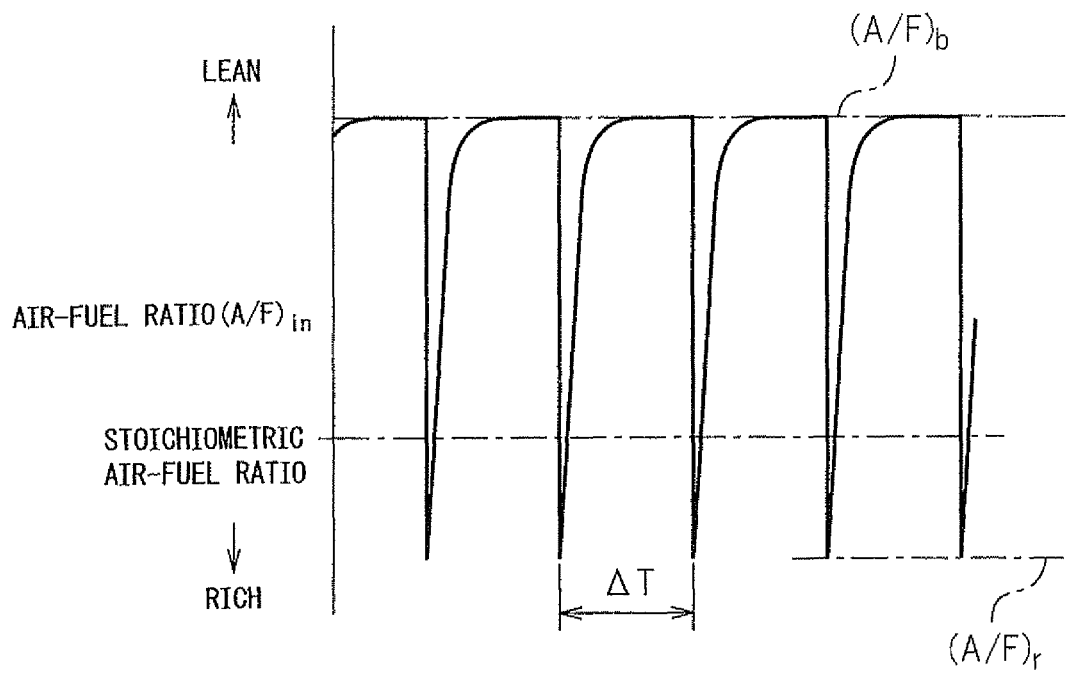
FIGS. 22A and 22B are time charts which show changes in the air-fuel ratio of the exhaust gas which flows into the exhaust purification catalyst.
Figure 22B:
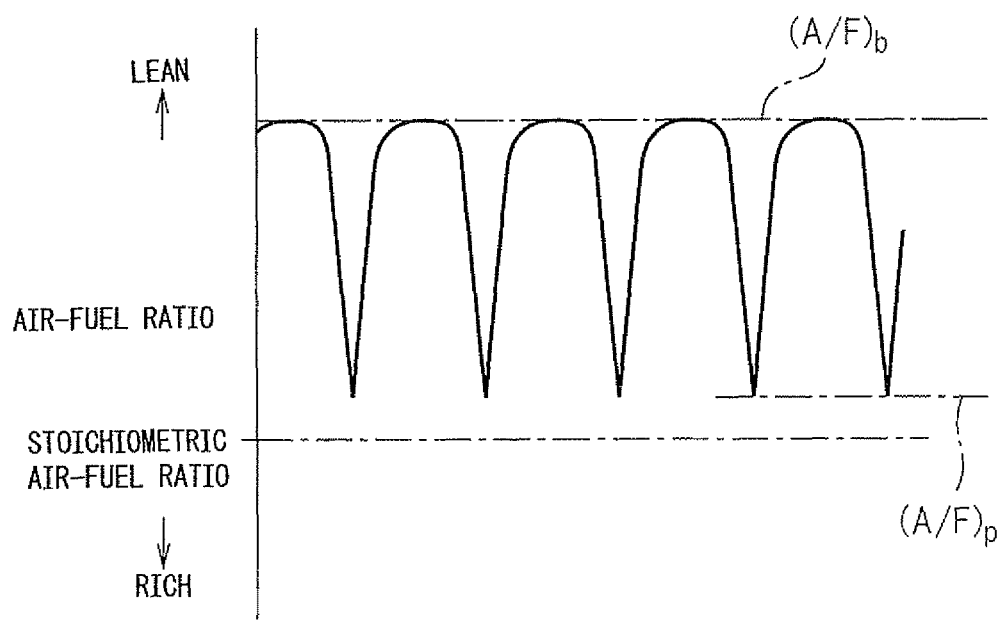

FIG. 22A shows a change of the air-fuel ratio (A/F)in of the exhaust gas which flows into the exhaust purification catalyst 13 when the hydrocarbon injection period is made the optimal hydrocarbon injection period ΔT which is shown in FIG. 21B and the hydrocarbon injection period is made the optimal hydrocarbon injection period WT which is shown in FIG. 21C, while FIG. 22B shows a change in the air-fuel ratio which is detected by the downstream side air-fuel ratio sensor 24 at this time. As will be understood from FIG. 22A and FIG. 22B, a rich side peak air-fuel ratio (A/F)r of the air-fuel ratio (A/F)in of the exhaust gas which flows into the exhaust purification catalyst 13 becomes rich, while a rich side peak air-fuel ratio (A/F)p of the air-fuel ratio which is detected by the downstream side air-fuel ratio sensor 24 becomes lean. This is believed to be because part of the hydrocarbons which are supplied deposit once on the exhaust purification catalyst 13, then evaporate with a time difference whereby the changes in the air-fuel ratio of the exhaust gas which flows out from the exhaust purification catalyst 13 is smoothed, so the peak value of the air-fuel ratio becomes smaller.

The rich side peak air-fuel ratio (A/F)p which is detected by the downstream side air-fuel ratio sensor 24 when the hydrocarbon injection period is made the optimal hydrocarbon injection period ΔT which is shown in FIG. 21B and the hydrocarbon injection period is made the optimal hydrocarbon injection period WT which is shown in FIG. 21C is found in advance by experiments. The rich side peak air-fuel ratio (A/F)p which is found in advance by experiments is stored in advance as the target peak air-fuel ratio (A/F)t with respect to the different engine operating states. In this embodiment of the present invention, this target peak air-fuel ratio (A/F)t is stored as a function of the engine speed N and engine output torque Te in the form of a map as shown in FIG. 23 in advance in the ROM 32.

Figure 24:
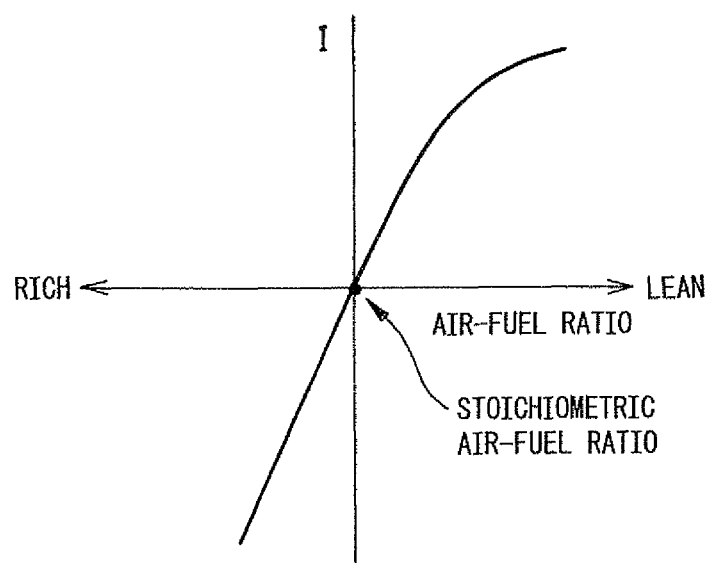
FIG. 24 is a view which shows an output of an air-fuel ratio sensor.

FIG. 24 schematically shows the relationship between the output current I of the air-fuel ratio sensors 23 and 24 and the air-fuel ratio. From FIG. 24, it will be understood that the output current I of the air-fuel ratio sensors 23 and 24 changes in accordance with the air-fuel ratio and therefore it is possible to detect the air-fuel ratio from the output current I of the air-fuel ratio sensors 23 and 24.

Figure 23:
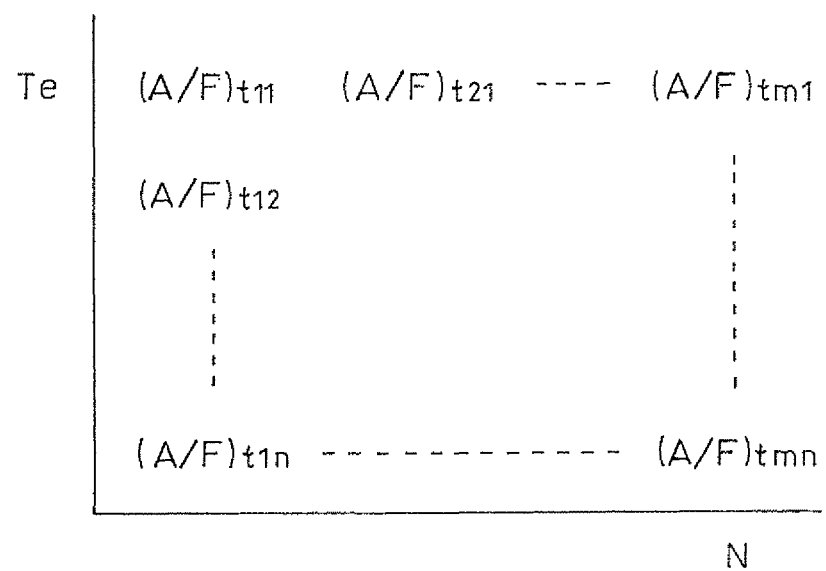
FIG. 23 is a view which shows a target peak air-fuel ratio.

If the hydrocarbon injection period deviates from the optimal hydrocarbon injection period WT which is shown in FIG. 21C, the rich side peak air-fuel ratio (A/F)p of the air-fuel ratio which is detected by the downstream side air-fuel ratio sensor 24 also deviates from the target peak air-fuel ratio (A/F)t which is shown in FIG. 23. At this time, if controlling the hydrocarbon injection period, so that the rich side peak air-fuel ratio (A/F)p of the air-fuel ratio which is detected by the downstream side air-fuel ratio sensor 24 becomes the target peak air-fuel ratio (A/F)t which is shown in FIG. 23, the hydrocarbon injection period becomes the optimal hydrocarbon injection period WT which is shown in FIG. 21C and as a result the maximum $NO_X$ purification rate can be secured.

In this way, if arranging the downstream side air-fuel ratio sensor 24 at the exhaust purification catalyst 13, it becomes possible to use the output signal of the downstream side air-fuel ratio sensor 24 as the basis to control the hydrocarbon injection period to the optimal hydrocarbon injection period. Therefore, in the present invention, the downstream side air-fuel ratio sensor 24 for detecting the air-fuel ratio of the exhaust gas is arranged in the engine exhaust passage downstream of the exhaust purification catalyst 13, and the injection amount of hydrocarbons from the hydrocarbon feed valve 15 is controlled based on the output signal of the downstream side air-fuel ratio sensor 24 so that the amplitude of the change in concentration of hydrocarbons which flows into the exhaust purification catalyst 13 becomes within a predetermined range of amplitude.

Figure 25:
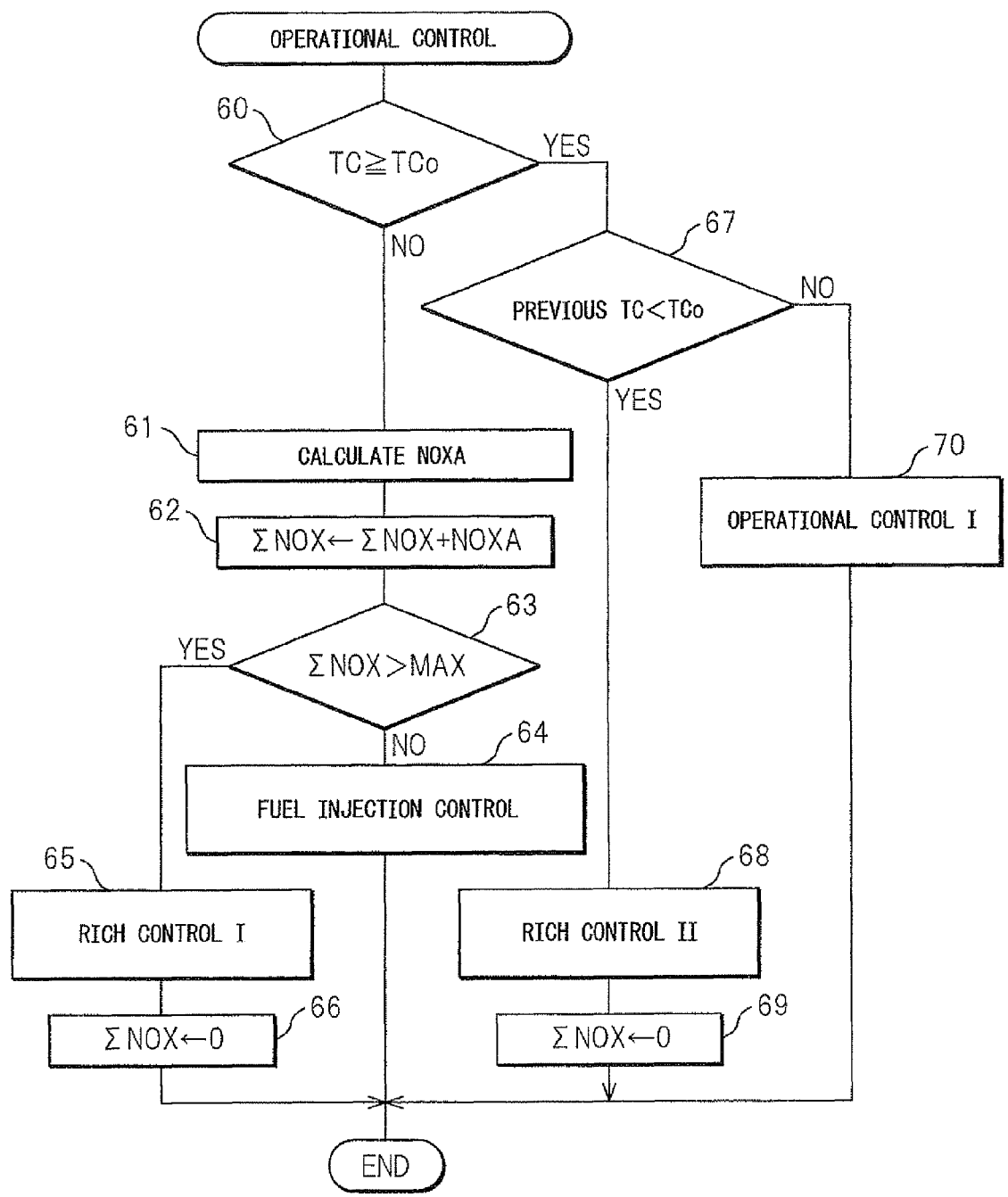
FIG. 25 is a flowchart for operational control.

Explaining this in a bit more detail, as shown in FIG. 22A, when the injection period of hydrocarbons from the hydrocarbon feed valve 15 is controlled so that the concentration of hydrocarbons which flow into the exhaust purification catalyst 13 vibrates by a predetermined range of period as shown in FIG. 22B, the air-fuel ratio which is detected by the downstream side air-fuel ratio sensor 24 also vibrates. In this case, in the embodiment according to the present invention, when the rich side peak air-fuel ratio (A/F)p which is detected by the downstream side air-fuel ratio sensor 24 becomes the lean side from the predetermined air-fuel ratio (A/F)t, the injection amount of hydrocarbons from the hydrocarbon feed valve 15 is made to increase, while when the rich side peak air-fuel ratio (A/F)p which is detected by the downstream side air-fuel ratio sensor 24 becomes the rich side from the predetermined air-fuel ratio (A/F)t, the injection amount of hydrocarbons from the hydrocarbon feed valve 15 is made to decrease, Next, the operational control routine which is shown in FIG. 25 will be explained. Note that, this routine is executed by interruption every a fixed time period.

Referring to FIG. 25, first, at step 60, it is judged from the output signal of the temperature sensor 25 if a temperature TC of the exhaust purification catalyst 13 exceeds an activation temperature TCo. When TC<TCo, that is, when the exhaust purification catalyst 13 is not activated, it is judged that the second $NO_X$ purification method should be used, then the routine proceeds to step 61. At step 61, the $NO_X$ amount NOXA exhausted per unit time is calculated from the map which is shown in FIG. 17. Next, at step 62, the exhausted $NO_X$ amount NOXA is added to the ΣNOX so as to calculate the stored $NO_X$ amount ΣNOX. Next, at step 63, it is judged if the stored $NO_X$ amount ΣNOX exceeds the allowable value MAX.

When it is judged at step 63 that ΣNOX≤MAX, the routine proceeds to step 64 where processing is performed for injecting fuel from the fuel injector 3. At this time, fuel is injected from the fuel injector 3 so as to give a predetermined lean air-fuel ratio which is determined from the operating state of the engine. As opposed to this, when it is judged at step 63 that ΣNOX>MAX, the routine proceeds to step 65 where the rich control I is performed. That is, the additional fuel amount WR is calculated from the map which is shown in FIG. 19 and the injection action of additional fuel is performed. At this time, the stored $NO_X$ is released from the exhaust purification catalyst 13. Next, at step 66, ΣNOX is cleared.

On the other hand, when it is judged at step 60 that TC≥TCo, that is, when the exhaust purification catalyst 13 is activated, the routine proceeds to step 67 where it is judged if TC<TCo at the time of the previous interruption. When TC<TCo at the time of the previous interruption, that is, when the exhaust purification catalyst 13 is now activated, the routine proceeds to step 68 where the rich control II is performed. At this time as well, the additional fuel amount WR is calculated from the map which is shown in FIG. 19, the action of injection of the additional fuel is performed, and the stored $NO_X$ is released from the exhaust purification catalyst 13. Next, at step 69, ΣNOX is cleared.

As opposed to this, when TC≥TCo even at the time of the previous interruption, that is, when the exhaust purification catalyst 13 is already activated, the routine proceeds to step 70 where the operational control I is performed. In this operational control I, an $NO_X$ purification action is performed by the first $NO_X$ purification method according to the present invention. That is, when the exhaust purification catalyst 13 is not activated, an $NO_X$ purification action is performed by the second $NO_X$ purification method. If the exhaust purification catalyst 13 is activated, the second $NO_X$ purification method is switched to the first $NO_X$ purification method.

When the second $NO_X$ purification method is switched to the first $NO_X$ purification method, if the exhaust purification catalyst 13 stores $NO_X$, the $NO_X$ which is stored from the exhaust purification catalyst 13 is released all at once without being reduced. Therefore, in the example which is shown in FIG. 25, to stop the $NO_X$ which is stored from the exhaust purification catalyst 13 in this way being released all at once without being reduced, right before the second $NO_X$ purification method is switched to the first NO purification method, at step 68, the rich control II is performed for releasing the stored $NO_X$ from the exhaust purification catalyst 13 by the second $NO_X$ purification method.

Figure 26:
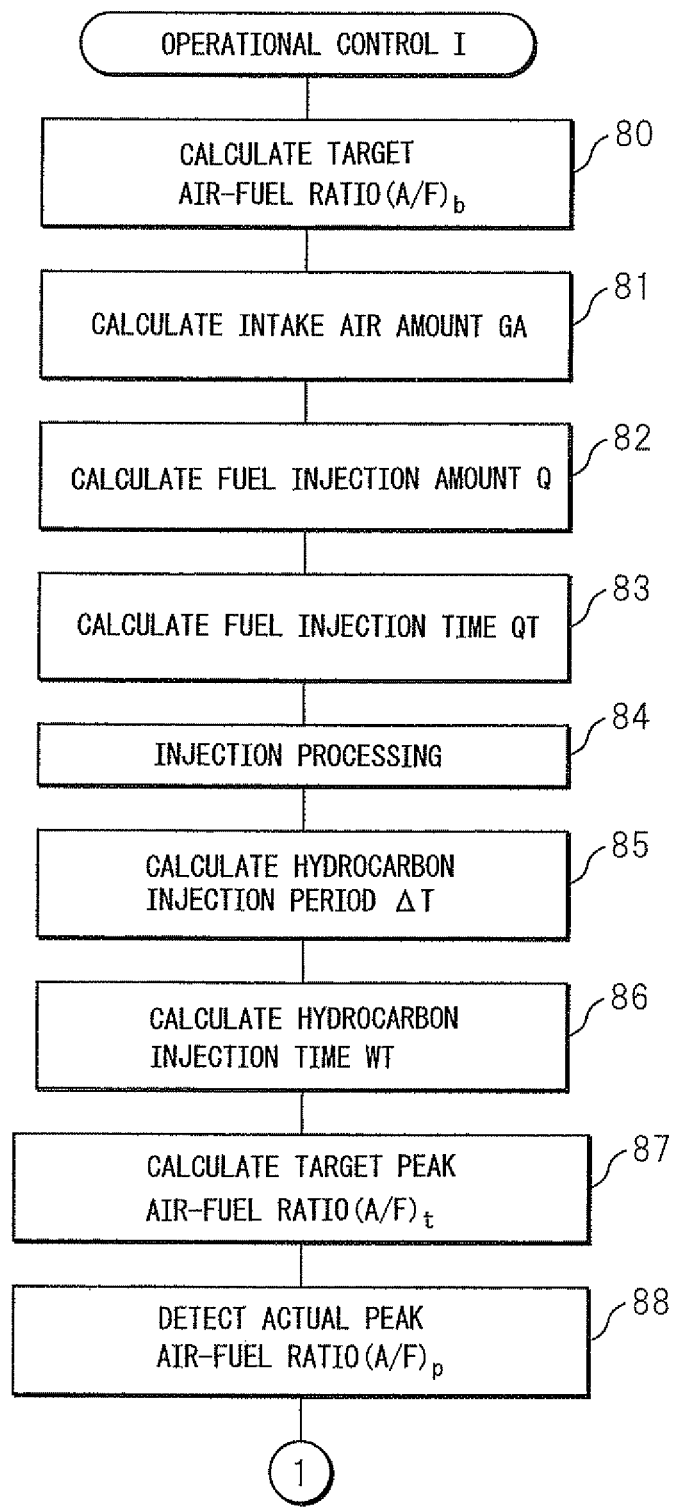
FIGS. 26 and 27 are flowcharts which show an embodiment of operational control I.
Figure 27:
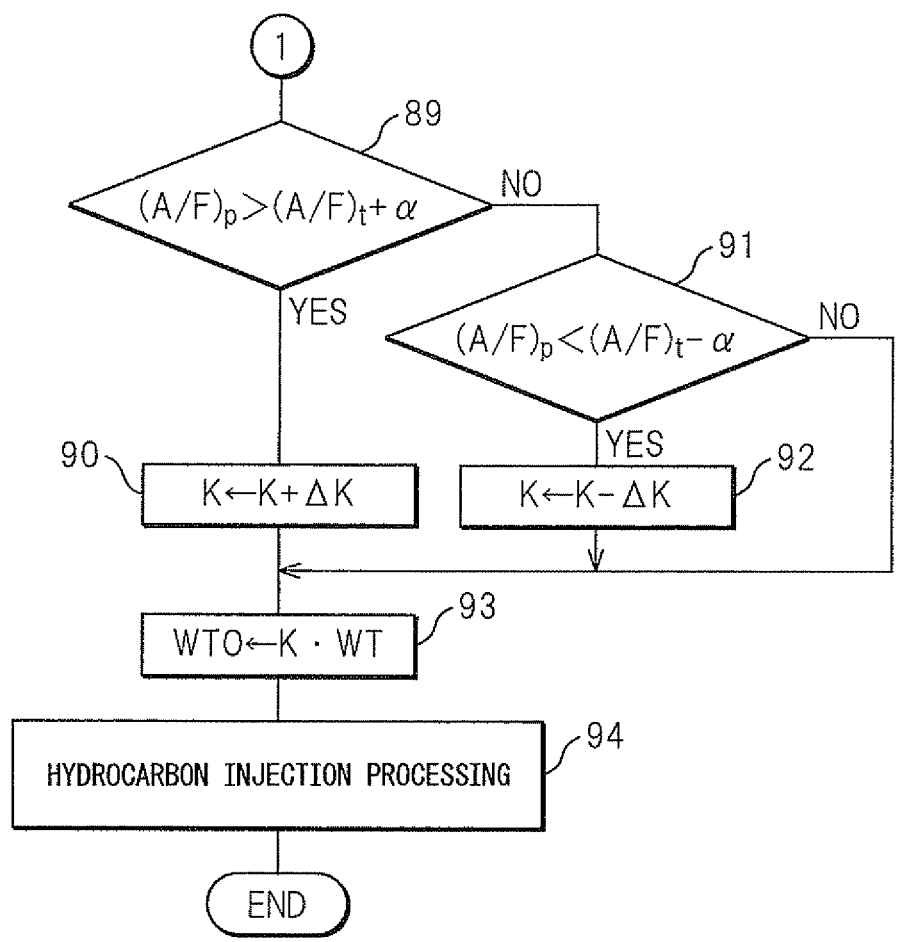

Next, the operational control I which is performed at step 70, that is, the $NO_X$ purification action by the first $NO_X$ purification method, will be explained. FIG. 26 and FIG. 27 show a first embodiment of this operational control I.

Referring to FIG. 26, first, at step 80, the target value of the base air-fuel ratio, that is, the target air-fuel ratio (A/F)b, is calculated from the map which is shown in FIG. 20B. Next, at step 81, the intake air amount GA is calculated from the output signal of the intake air amount detector 8. Next, at step 82, the fuel injection amount Q for generation of output from the fuel injector 3 which is required for making the base air-fuel ratio the target air-fuel ratio (A/F)b is calculated from the target air-fuel ratio (A/F)b and the intake air amount GA. Next, at step 83, the fuel injection time QT is calculated from this fuel injection amount Q, next, at step 84, fuel injection processing is performed to inject fuel from the fuel injector 3 in accordance with this fuel injection time QT.

Next, at step 85, the optimal hydrocarbon injection period ΔT is calculated from the map which is shown in FIG. 21B. Next, at step 86, the optimal hydrocarbon injection period WT is calculated from the map which is shown in FIG. 21C. Next, at step 87, the target peak air-fuel ratio (A/F)t is calculated from the map which is shown in FIG. 23. Next, at step 88, the actual rich side peak air-fuel ratio (A/F)p is detected from the output of the downstream side air-fuel ratio sensor 24.

Next, at step 89, it is judged if the actual rich side peak air-fuel ratio (A/F)p is larger than the value of the target peak air-fuel ratio (A/F)t plus a small constant value a. When (A/F)p>(A/F)t+α, the routine proceeds to step 90 where a constant value ΔK is added to the correction coefficient K for the hydrocarbon injection period WT. Next, the routine proceeds to step 93 where a hydrocarbon injection period WT multiplied with the correction coefficient K (K·WT) is made the final hydrocarbon injection period WTO.

On the other hand, when it is judged at step 89 that (A/F)p>(A/F)t+α does not stand, the routine proceeds to step 91 where it is judged if the actual rich side peak air-fuel ratio (A/F)p is smaller than the target peak air-fuel ratio (A/F)t minus the constant value α. When (A/F)p<(A/F)t−α, the routine proceeds to step 92 where the correction coefficient K is reduced by the constant value ΔK whereupon the routine proceeds to step 93. Next, at step 94, hydrogen injection processing is performed to inject hydrocarbons from the hydrocarbon feed valve 15 in accordance with the final hydrocarbon injection period WTO.

In this way, in this embodiment, when (A/F)p>(A/F)t+α, the hydrocarbon injection period is increased, while when (A/F)p<(A/F)t−α, the hydrocarbon injection period is made to decrease, so the actual rich side peak air-fuel ratio (A/F)p is made to match the target peak air-fuel ratio (A/F)t. As a result, a high $NO_X$ purification rate can be obtained.

In this regard, in the first embodiment of this operational control I, the fuel injection amount Q for generation of output which is required for making the base air-fuel ratio the target air-fuel ratio (A/F)b is calculated based on the intake air amount GA which is detected by the intake air detector 8, then the fuel injection time QT is calculated from this fuel injection amount Q. In this case, so long as the intake air amount detector 8 is operating normally, the base air-fuel ratio is held at the target air-fuel ratio (A/F)b. In this regard, in this case, for example, if the intake air amount detector 8 has deteriorated and that output signal of the intake air detector 8 no longer accurately shows the intake air amount, the base air-fuel ratio will no longer match the target air-fuel ratio (A/F)b.

On the other hand, in the first embodiment of the operational control I, the downstream side air-fuel ratio sensor 24 is used to make the actual rich side peak air-fuel ratio (A/F)p the target peak air-fuel ratio (A/F)t by feedback control of the hydrocarbon feed amount. In this case, even if the base air-fuel ratio has deviated from the target air-fuel ratio (A/F)b, the actual rich side peak air-fuel ratio (A/F)p is controlled to become the target peak air-fuel ratio (A/F)t. That is, in the first embodiment of this operational control I, even if the base air-fuel ratio deviates, the actual rich side peak air-fuel ratio (A/F)p is controlled to become the target peak air-fuel ratio (A/F)t.

However, the rich side peak air-fuel ratio (A/F)r of the air-fuel ratio (A/F)in of the exhaust gas flowing into the exhaust purification catalyst 13, which gives the highest $NO_X$ purification rate, is determined with respect to the base air-fuel ratio. This rich side peak air-fuel ratio (A/F)r which gives the highest $NO_X$ purification rate changes commensurately if the base air-fuel ratio changes. Therefore, when the base air-fuel ratio deviates from the target air-fuel ratio (A/F)b, the base air-fuel ratio is preferably returned to the target air-fuel ratio (A/F)b.

Therefore, in the second embodiment of the operational control I which is shown at step 70 of FIG. 25, the upstream side air-fuel ratio sensor 23 is used to control the base air-fuel ratio to the target air-fuel ratio (A/F)b. That is, in the second embodiment of this operational control I, the air-fuel ratio of the exhaust gas which is exhausted from the engine is detected by the upstream side air-fuel ratio sensor 23, and the fuel injection time QT from the fuel injector 3 is corrected so that the detected air-fuel ratio becomes the target air-fuel ratio (A/F)b. If using the upstream side air-fuel ratio sensor 23 in this way, even if the intake air amount detector 8 deteriorates, the base air-fuel ratio can be maintained at the target air-fuel ratio (A/F)b.

Figure 28:
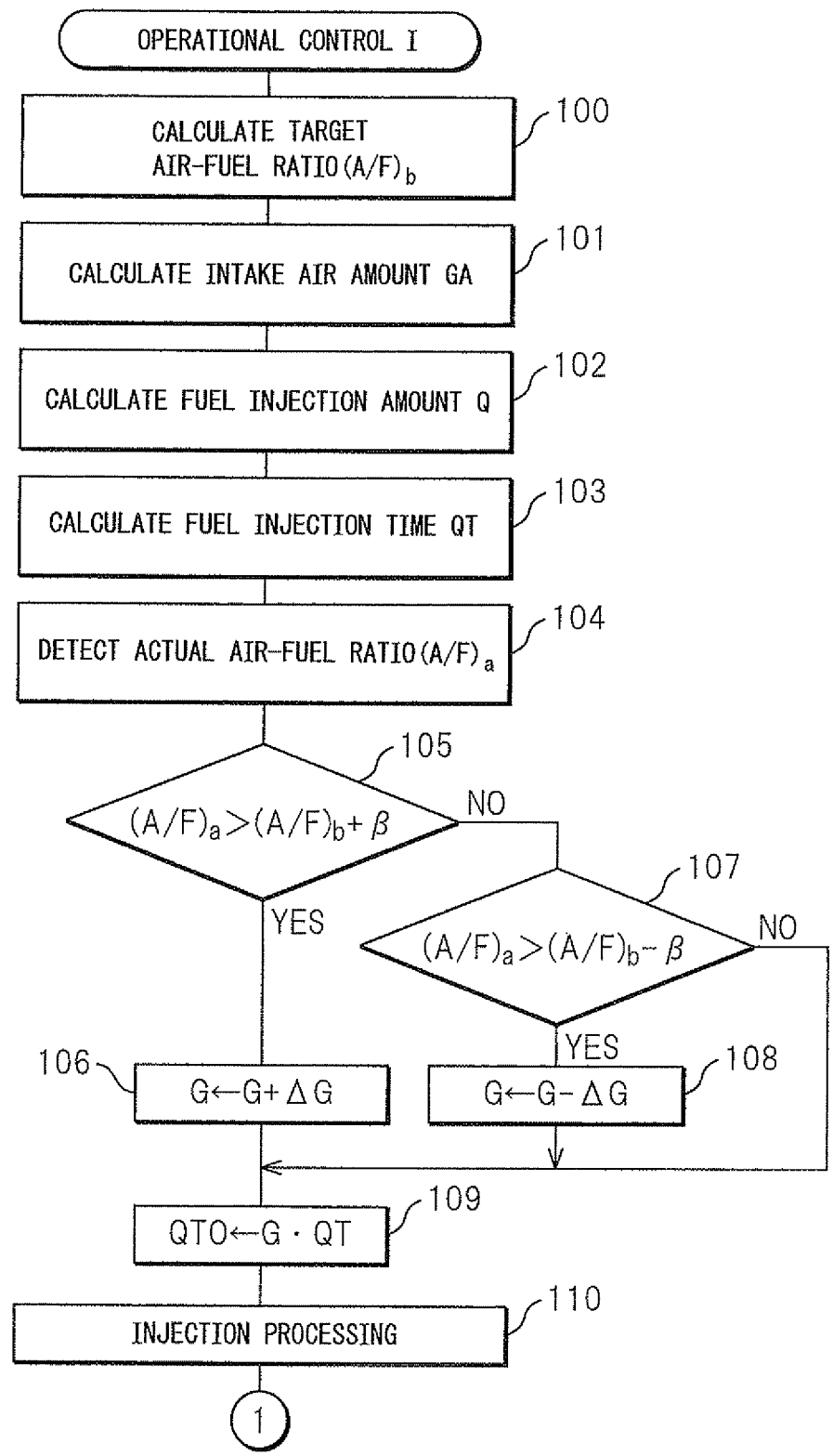
FIGS. 28 and 29 are flowcharts which show another embodiment of operational control I.
Figure 29:
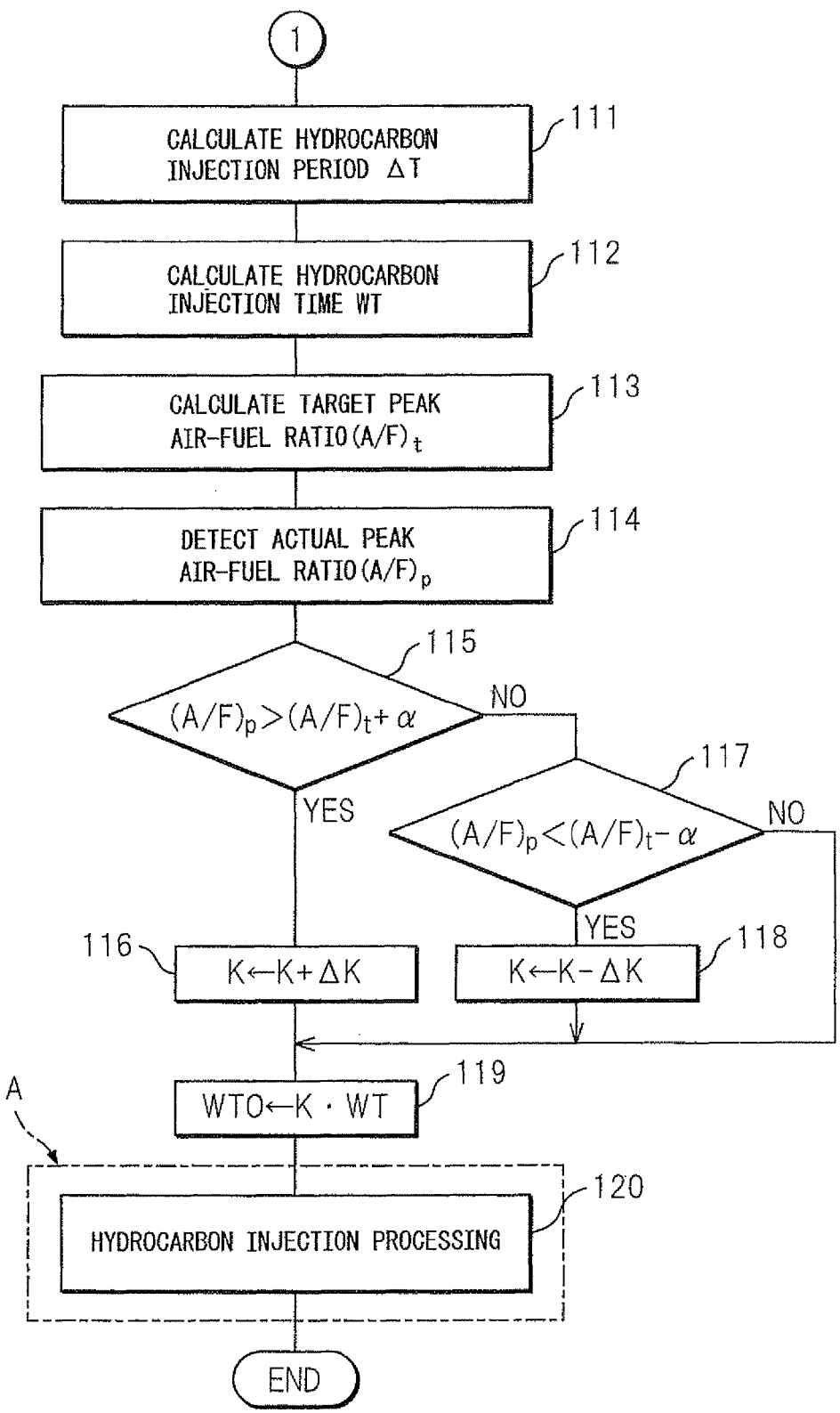

FIG. 28 and FIG. 29 show the routine for working the second embodiment of this operational control I. Note that, in the routine which is shown in FIG. 28 and FIG. 29, steps 100 to 103 are the same as steps 80 to 83 of FIG. 26. In the routine which is shown in FIG. 28 and FIG. 29, steps 111 and 120 are the same as steps 85 to 94 of FIG. 26 and FIG. 27.

That is, referring to FIG. 28, first, at step 100, the target value of the base air-fuel ratio, that is, the target air-fuel ratio (A/F)b, is calculated from the map which is shown in FIG. 20B. Next, at step 101, the intake air amount GA is calculated from the output signal of the intake air amount detector 8. Next, at step 102, from the target air-fuel ratio (A/F)b and the intake air amount GA, the fuel injection amount Q for output generation from the fuel injector 3 which is required for making the base air-fuel ratio the target air-fuel ratio (A/F)b is calculated. Next, at step 103, the fuel injection time QT is calculated from this fuel injection amount Q.

Next, at step 104, the output of the upstream side air-fuel ratio sensor 23 is used as the basis to detect the actual air-fuel ratio (A/F)a of the exhaust gas which is exhausted from the engine. Next, at step 105, it is judged if the actual air-fuel ratio (A/F)a is larger than the target air-fuel ratio (A/F)b plus a small constant value β. When (A/F)a>(A/F)b+β, the routine proceeds to step 106 where the correction coefficient G for the fuel injection time QT is increased by a constant value ΔG. Next, the routine proceeds to step 106 where the fuel injection time QT multiplied with the correction coefficient G, that is, the value (G·QT), is made the final fuel injection time QTO.

On the other hand, when it is judged at step 105 that (A/F)a>(A/F)b+β does not stand, the routine proceeds to step 107 where it is judged if the actual air-fuel ratio (A/F)a of the exhaust gas which is exhausted from the engine is smaller than the target peak air-fuel ratio (A/F)b minus a constant value β. When (A/F)a<(A/F)b−β, the routine proceeds to step 108 where the correction coefficient G is reduced by a constant value ΔG, then the routine proceeds to step 109. Next, at step 110, processing is performed to inject fuel from the fuel injector 3 in accordance with the fuel injection time QTO.

In this way, in this embodiment, when (A/F)a>(A/F)b+β, the fuel injection time is increased, while when (A/F)a<(A/F)b−β, the fuel injection time is made to decrease, so the actual air-fuel ratio of the exhaust gas which is exhausted from the engine, that is, the actual base air-fuel ratio (A/F)a, is made to match the target air-fuel ratio (A/F)b.

Next, at step 111, the optimal hydrocarbon injection period ΔT is calculated from the map which is shown in FIG. 21B. Next, at step 112, the optimal hydrocarbon injection period WT is calculated from the map which is shown in FIG. 21C. Next, at step 113, the target peak air-fuel ratio (A/F)t is calculated from the map which is shown in FIG. 23. Next, at step 114, the actual rich side peak air-fuel ratio (A/F)p is detected from the output of the downstream side air-fuel ratio sensor 24.

Next, at step 115, it is judged if the actual rich side peak air-fuel ratio (A/F)p is larger than the target peak air-fuel ratio (A/F)t plus a small constant value α. When (A/F)p>(A/F)t+α, the routine proceeds to step 116 where the correction coefficient K for the hydrocarbon injection period WT is increased by a constant value ΔK. Next, the routine proceeds to step 119 where the hydrocarbon injection period WT multiplied with the correction coefficient K, that is, the value (K·WT), is made the final hydrocarbon injection period WTO.

On the other hand, when it is judged at step 115 that (A/F)p>(A/F)t+α does not stand, the routine proceeds to step 117 where it is judged if the actual rich side peak air-fuel ratio (A/F)p is smaller than the target peak air-fuel ratio (A/F)t minus a constant value α. When (A/F)p<(A/F)t−α, the routine proceeds to step 118 where the correction coefficient K is reduced by a constant value ΔK, then the routine proceeds to step 119. Next, at step 120, hydrocarbon injection processing is performed for injecting hydrocarbons from the hydrocarbon feed valve 15 in accordance with the final hydrocarbon injection period WTO.

In this way, when (A/F)p>(A/F)t+α, the hydrocarbon injection period is increased, while when (A/F)p<(A/F)t−α, the hydrocarbon injection period is made to decrease, so the actual rich side peak air-fuel ratio (A/F)p is made to match the target peak air-fuel ratio (A/F)t.

In this way, in the second embodiment of this operational control I, on the basis of both the output signal of the upstream side air-fuel ratio sensor 23 arranged in the engine exhaust passage upstream of the hydrocarbon feed valve 15 and the output signal of the downstream side air-fuel ratio sensor 24, the injection amount of hydrocarbons from the hydrocarbon feed valve 15 is controlled so that the amplitude of the change in concentration of hydrocarbons which flow into the exhaust purification catalyst 13 becomes within a predetermined range of amplitude. In this case, in the second embodiment of this operational control I, the amount of fuel which is fed to the engine combustion chamber 2 is controlled based on the output signal of the upstream side air-fuel ratio sensor 23 so that the air-fuel ratio of the exhaust gas which is exhausted from the engine, that is, the base air-fuel ratio, becomes a predetermined air-fuel ratio, that is, the target air-fuel ratio (A/F)b. Based on the output signal of the downstream side air-fuel ratio sensor 24, the rich side peak air-fuel ratio (A/F)p of the exhaust gas which flows out from the exhaust purification catalyst 13 is controlled to become the target peak air-fuel ratio (A/F)t. That is, in the second embodiment of this operational control I, in a state where the base air-fuel ratio is maintained at the target air-fuel ratio (A/F)b, the rich side peak air-fuel ratio (A/F)r of the air-fuel ratio (A/F)in of the exhaust gas which flows into the exhaust purification catalyst 13 is accurately controlled to the target air-fuel ratio (A/F)b, so a high $NO_X$ purification rate can be obtained.

Next, a third embodiment of the operational control I which is shown at step 70 of FIG. 25 will be explained. In this third embodiment of the operational control I, the actual air-fuel ratio (A/F)a which is detected by the upstream side air-fuel ratio sensor 23 and the actual rich side peak air-fuel ratio (A/F)p which is detected by the downstream side air-fuel ratio sensor 24 are used to calculate the hydrocarbon injection period WTO from the hydrocarbon feed valve 15 from the difference between the actual air-fuel ratio (A/F)a which is detected by the upstream side air-fuel ratio sensor 23 and the target air-fuel ratio (A/F)b and the difference of the actual rich side peak air-fuel ratio (A/F)p which is detected from the downstream side air-fuel ratio sensor 24 and the target peak air-fuel ratio (A/F)t on the basis of the following formula.

$$WTO \leftarrow WT \cdot [1+K1 \cdot ((A/F)a-(A/F)b)+K2 \cdot ((A/F)p-(A/F)t)]$$

where, WT is the hydrocarbon injection period from the hydrocarbon feed valve 15 which is calculated from the map of FIG. 21C, and K1 and K2 are positive constants.

From the above formula, it is understood that when the actual air-fuel ratio (A/F)a which is detected by the upstream side air-fuel ratio sensor 23 is at the lean side from the target air-fuel ratio (A/F)b, the injection amount of hydrocarbons from the hydrocarbon feed valve 15 is made to increase, while when the actual air-fuel ratio (A/F)a which is detected by the upstream side air-fuel ratio sensor 23 is at the rich side from the target air-fuel ratio (A/F)b, the injection amount of hydrocarbons from the hydrocarbon feed valve 15 is made to decrease. Furthermore, it is learned that when the actual rich side peak air-fuel ratio (A/F)p which is detected by the downstream side air-fuel ratio sensor 24 is at the lean side from the target peak air-fuel ratio (A/F)t, the injection amount of hydrocarbons from the hydrocarbon feed valve 15 is made to increase, while when the actual rich side peak air-fuel ratio (A/F)p which is detected by the downstream side air-fuel ratio sensor 24 is at the rich side from the target peak air-fuel ratio (A/F)t, the injection amount of hydrocarbons from the hydrocarbon feed valve 15 is made to decrease.

Expressing this in a bit more general terms, in the third embodiment of this operational control I, when the air-fuel ratio which is detected by the upstream side air-fuel ratio sensor 23 is at the lean side from a predetermined air-fuel ratio, the injection amount of hydrocarbons from the hydrocarbon feed valve 15 is increased, while when the air-fuel ratio which is detected by the upstream side air-fuel ratio sensor 23 is at the rich side from the predetermined air-fuel ratio, the injection amount of hydrocarbons from the hydrocarbon feed valve 15 is made to decrease. When the rich side peak air-fuel ratio which is detected by the downstream side air-fuel ratio sensor 24 is at the lean side from a predetermined air-fuel ratio, the injection amount of hydrocarbons from the hydrocarbon feed valve 15 is increased, while when the rich side peak air-fuel ratio which is detected by the downstream side air-fuel ratio sensor 24 is at the rich side from the predetermined air-fuel ratio, the injection amount of hydrocarbons from the hydrocarbon feed valve 15 is made to decrease.

Figure 30:
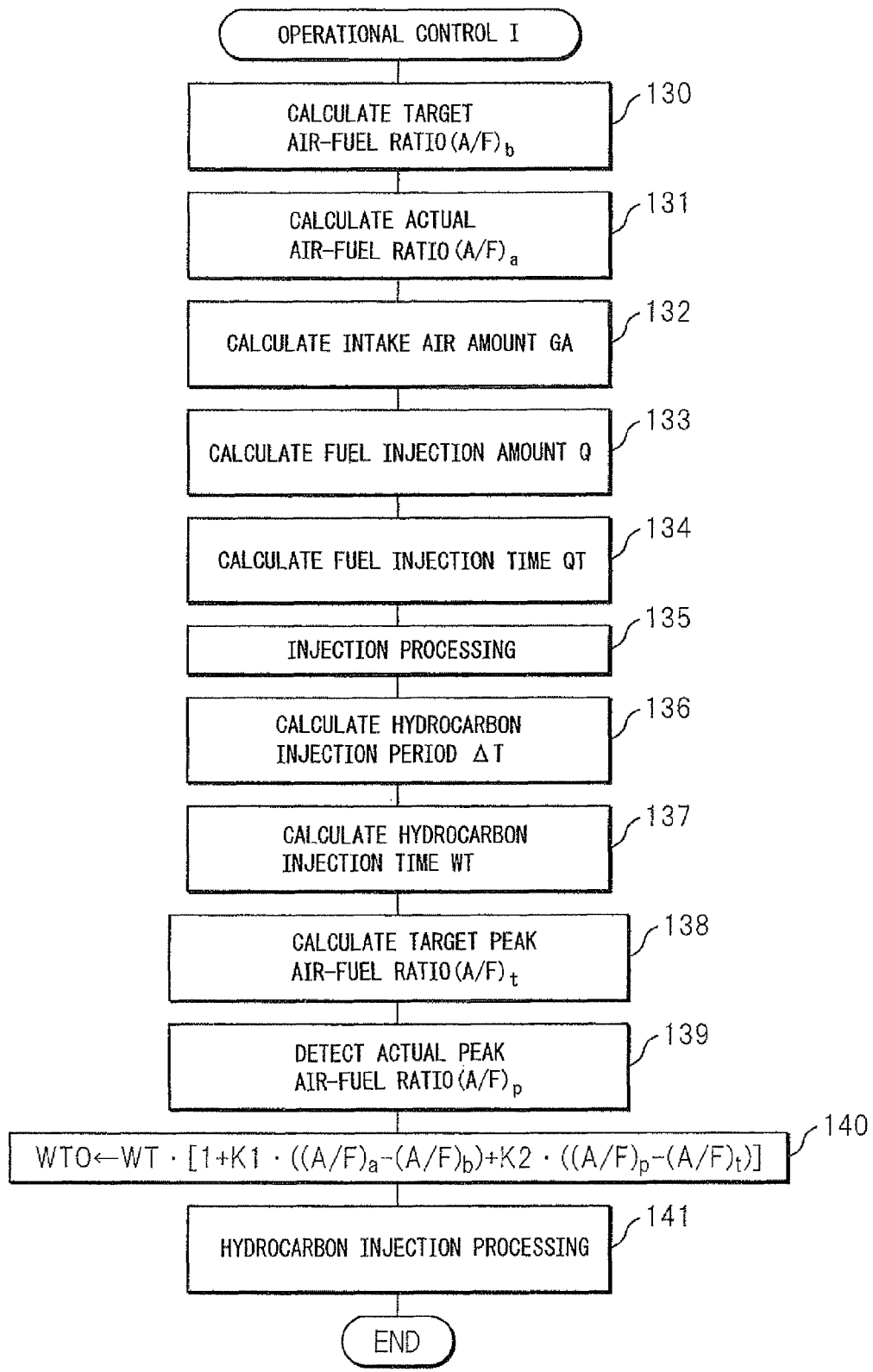
FIG. 30 is a flowchart which shows still another embodiment of operational control I.

FIG. 30 shows the routine of the third embodiment of the operational control I which is performed at step 70 of FIG. 25.

Referring to FIG. 30, first, at step 130, the target value of the base air-fuel ratio, that is, the target air-fuel ratio (A/F)b, is calculated from the map which is shown in FIG. 20B. Next, at step 131, the upstream side air-fuel ratio sensor 23 is used to detect the actual air-fuel ratio (A/F)a of the exhaust gas which is exhausted from the engine. Next, at step 132, the intake air amount GA is calculated from the output signal of the intake air amount detector 8. Next, at step 133, the fuel injection amount Q for generation of output from the fuel injector 3 which is required for making the base air-fuel ratio the target air-fuel ratio (A/F)b is calculated from the target air-fuel ratio (A/F)b and the intake air amount GA. Next, at step 134, the fuel injection time QT is calculated from this fuel injection amount Q, next, at step 135, fuel injection processing is performed to inject fuel from the fuel injector 3 in accordance with this fuel injection time QT.

Next, at step 136, the optimal hydrocarbon injection period ΔT is calculated from the map which is shown in FIG. 21B. Next, at step 137, the optimal hydrocarbon injection period WT is calculated from the map which is shown in FIG. 21C. Next, at step 138, the target peak air-fuel ratio (A/F)t is calculated from the map which is shown in FIG. 23. Next, at step 139, the actual rich side peak air-fuel ratio (A/F)p is detected from the output of the downstream side air-fuel ratio sensor 24. Next, at step 140, the hydrocarbon injection period WTO from the hydrocarbon feed valve 15 is calculated based on the following formula.

$$WTO \leftarrow WT \cdot [1+K1 \cdot ((A/F)a-(A/F)b)+K2 \cdot ((A/F)p-(A/F)t)]$$

Next, at step 141, hydrocarbon injection processing is performed to inject hydrocarbons from the hydrocarbon feed valve 15 in accordance with the calculated hydrocarbon injection period WTO.

Next, the diagnosis of the trouble of the exhaust purification catalyst 13 will be briefly explained. In the embodiment according to the present invention, as shown in FIG. 25, right before the second $NO_X$ purification method is switched to the first $NO_X$ purification method, rich control II is performed to release the stored $NO_X$ by the second $NO_X$ purification method. When this rich control II is performed, the diagnosis of the trouble of the exhaust purification system 13 is performed, that is, it is judged if the exhaust purification system 13 has deteriorated.

Figure 31:
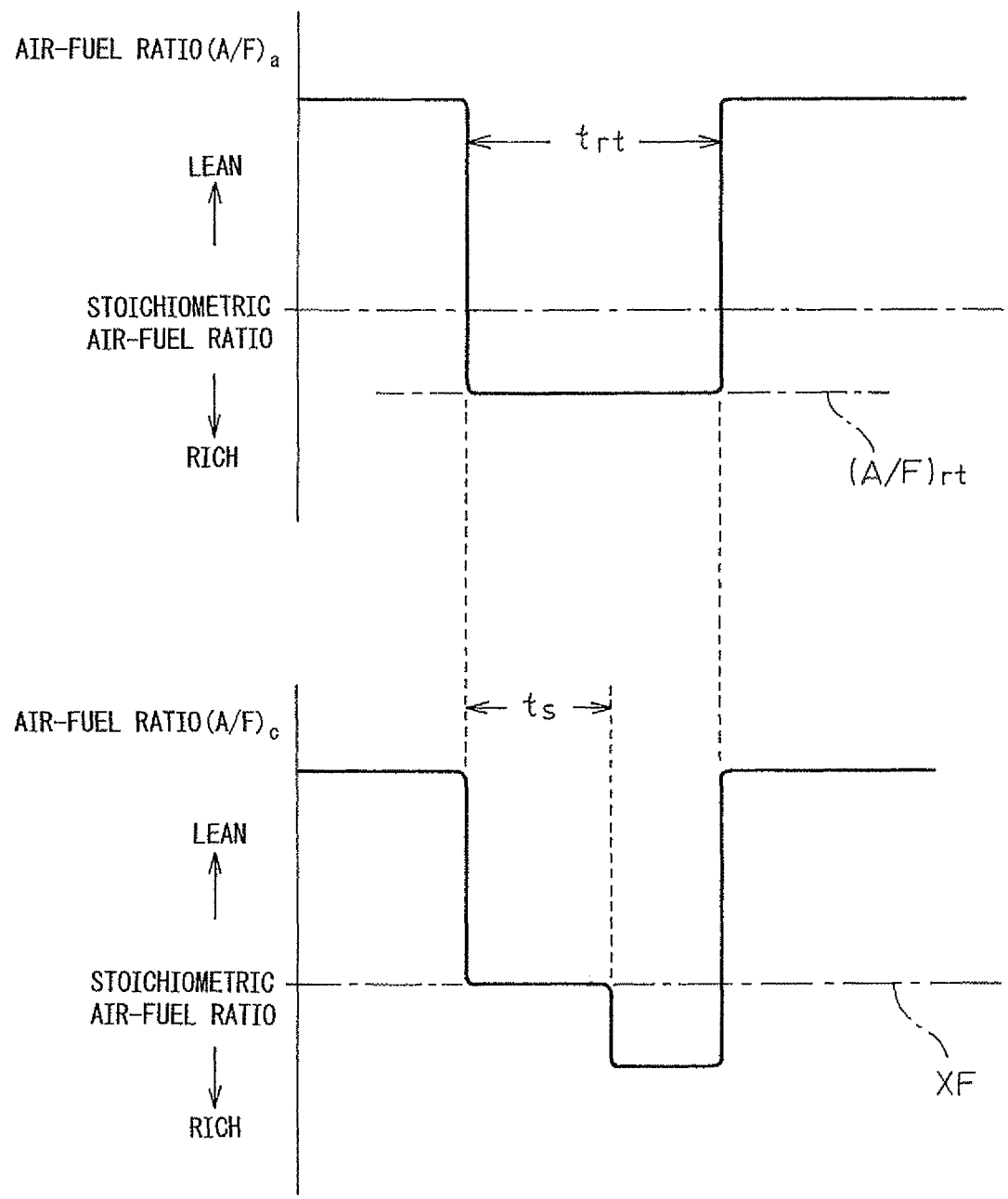
FIG. 31 is a view which shows changes in which the air-fuel ratio of the exhaust gas flows out from the exhaust purification catalyst.

FIG. 31 shows the changes in the air-fuel ratio of the exhaust gas (A/F)a which flows into the exhaust purification system 13 and the changes in the air-fuel ratio of the exhaust gas (A/F)c which is exhausted from the exhaust purification system 13 when this rich control. II is performed. The time period trt where the air-fuel ratio of the inflowing exhaust gas (A/F)a is made rich is several seconds. This time period trt is made to change in accordance with the amount of the stored $NO_X$. (A/F)rt shows the target rich air-fuel ratio when rich control II is performed. The additional fuel amount WR fed into the combustion chamber 2 is controlled by learning each time rich control. II is performed so that the actual air-fuel ratio (A/F)a which is detected by the upstream side air-fuel ratio sensor 23 becomes the target rich air-fuel ratio (A/F)rt.

On the other hand, the exhaust purification system 13 has the ability to store oxygen in the catalyst. When, in this way, the exhaust purification system 13 has an oxygen storing ability, when the air-fuel ratio of the inflowing exhaust gas (A/F)a is made rich, the excessive hydrocarbons in the exhaust gas react with the stored oxygen and are oxidized. At this time, while the action of oxidation of the excessive hydrocarbons in the exhaust gas is being performed, the air-fuel ratio of the discharged exhaust gas (A/F)c is maintained at the stoichiometric air-fuel ratio as shown by the time period ts of FIG. 31. In this regard, in this case, if the exhaust purification system 13 deteriorates, the oxygen storing ability falls. If the oxygen storing ability falls, when the air-fuel ratio of the inflowing exhaust gas (A/F)a is made rich, the time period ts during which the air-fuel ratio of the exhaust gas (A/F)c which is exhausted is maintained at the stoichiometric air-fuel ratio becomes shorter. Therefore, it is possible to detect that the exhaust purification system 13 has deteriorated by the time period is during which the air-fuel ratio of the exhaust gas (A/F)c which is discharged is maintained at the stoichiometric air-fuel ratio becoming shorter.

Next, FIG. 32 and FIG. 33 which show this rich control II will be explained.

Figure 32:
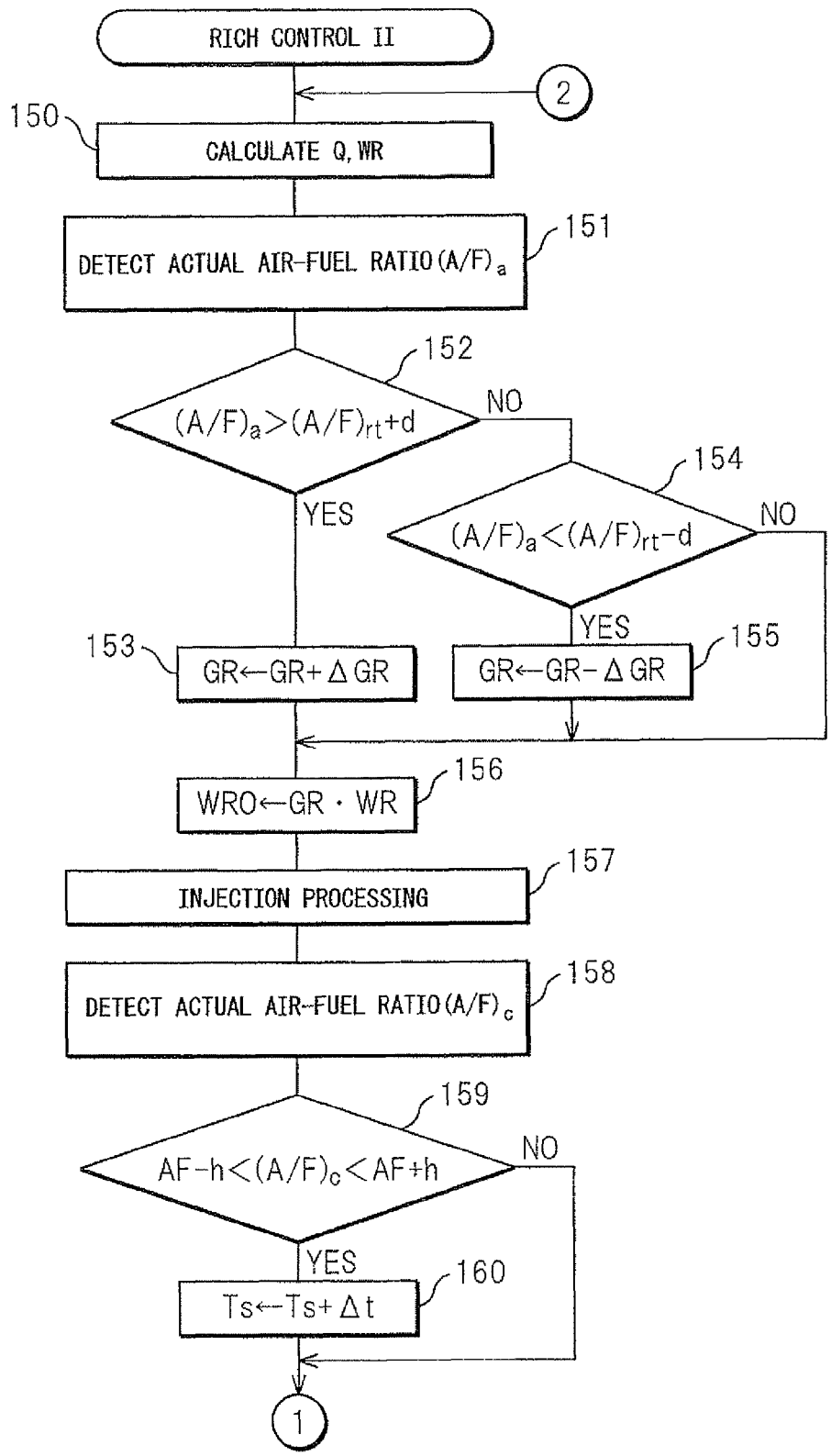
FIGS. 32 and 33 are flowcharts for executing rich control II.
Figure 33:
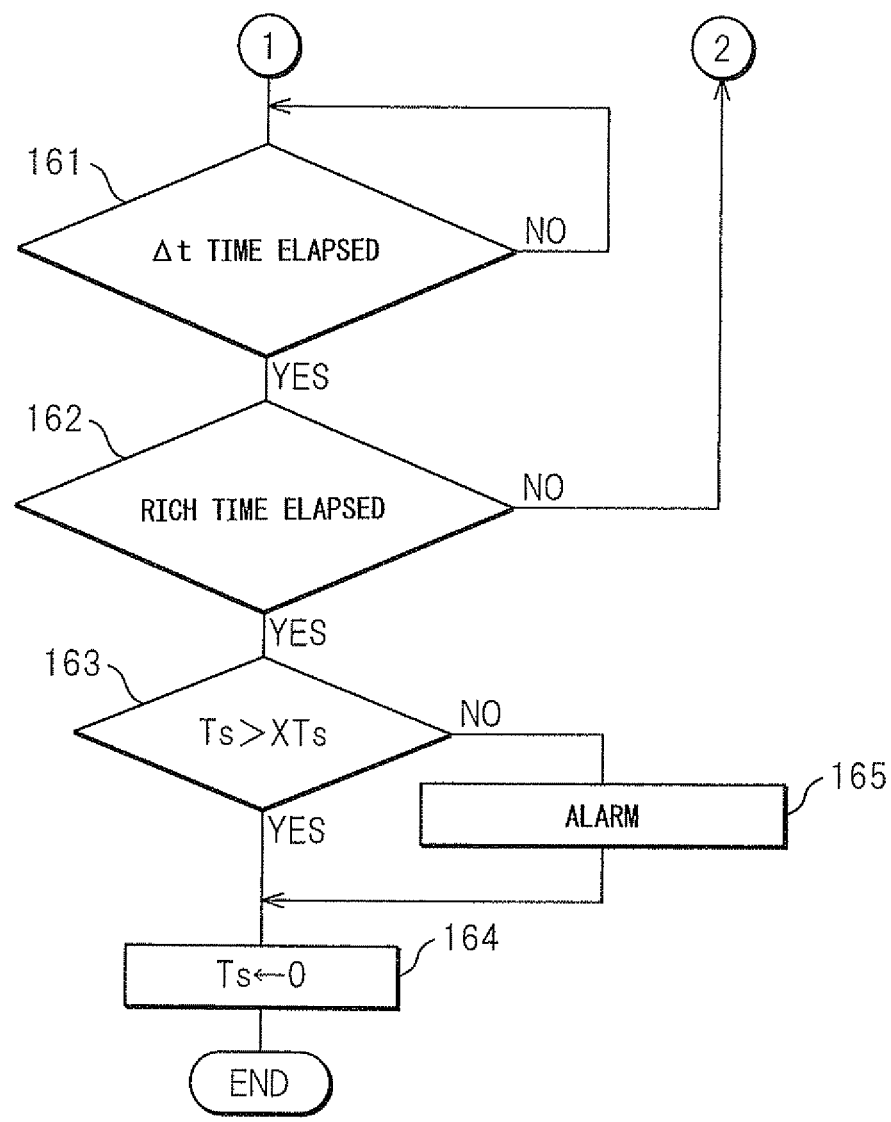

Referring to FIG. 32, first, at step 150, the fuel injection amount Q for generation of output which is shown in FIG. 18 is calculated and the additional fuel amount WR is calculated from the map which is shown in FIG. 19. Next, at step 151, the actual air-fuel ratio of the inflowing exhaust gas (A/F)a is detected by the upstream side air-fuel ratio sensor 23. Next, at step 152, it is judged if the air-fuel ratio of the inflowing exhaust gas (A/F)a is larger than the target rich air-fuel ratio (A/F)rt plus a small constant value d. When (A/F)a>(A/F)rt+d, the routine proceeds to step 153 where the constant value ΔGR is added to the learned value GR for the additional fuel amount WR. Next, the routine proceeds to step 156 where the additional fuel amount WR multiplied with the learned value GR (GR·WR) is made the final additional fuel amount WRO.

On the other hand, when it is judged at step 152 that (A/F)a>(A/F)rt+d does not stand, the routine proceeds to step 154 where it is judged if the actual air-fuel ratio of the inflowing exhaust gas (A/F)a is smaller than the target peak air-fuel ratio (A/F)rt minus a constant value α. When (A/F)a<(A/F)rt−d, the routine proceeds to step 155 where a constant value ΔGR is subtracted from the learned value GR, then the routine proceeds to step 156. Next, at step 157, fuel injection processing is performed to inject the additional fuel WRO in addition to the fuel injection amount Q from the fuel injector 3 in accordance with the final additional fuel amount WRO.

In this way, when (A/F)a>(A/F)rt+d, the additional fuel WR is increased, while when (A/F)a<(A/F)rt−d, the additional fuel WR is decreased, so the actual air-fuel ratio of the inflowing exhaust gas (A/F)a is made to match with the target rich air-fuel ratio (A/F)rt.

Next, at step 158, the actual air-fuel ratio of the discharged exhaust gas (A/F)c is detected by the downstream side air-fuel ratio sensor 24. Next, at step 159, it is judged if the actual air-fuel ratio of the discharged exhaust gas (A/F)c is smaller than the stoichiometric air-fuel ratio plus a small constant value h and is larger than the stoichiometric air-fuel ratio minus the constant value h, that is, the air-fuel ratio of the exhausted exhaust gas (A/F)c, is about the stoichiometric air-fuel ratio. When the air-fuel ratio of the exhausted exhaust gas (A/F)c is about the stoichiometric air-fuel ratio, the routine proceeds to step 160 where a fixed time Δt is added to the stoichiometric air-fuel ratio duration Ts.

Next, at step 161, the Δt time is waited, then the routine proceeds to step 162 where it is judged if the rich time which is shown by trt in FIG. 31 has elapsed. When the rich time has not elapsed, the routine returns to step 150. That is, until the rich time elapses, the routine returns to step 150 every Δt time. As opposed to this, when the rich time has elapsed, the routine proceeds to step 163 where it is judged if the stoichiometric air-fuel ratio duration Ts is longer than the deterioration judgment reference time XTs. When Ts>XTs, it is judged that the exhaust purification system 13 is not deteriorated, then the routine proceeds to step 164 where Ts is cleared. As opposed to this, when Ts≤XTs, it is judged that the exhaust purification system 13 is deteriorated and the routine proceeds to step 165 where an alarm is issued.

Next, the diagnosis of the trouble of the exhaust purification system, in particular the hydrocarbon feed valve 15, will be explained.

Now, in the second embodiment of the operational control I which is shown in FIG. 28 and FIG. 29, as explained earlier, the base air-fuel ratio is controlled based on the output signal of the upstream side air-fuel ratio sensor 23 so as to be maintained at the target air-fuel ratio (A/F)b. In the state where the base air-fuel ratio is maintained at the target air-fuel ratio (A/F)b in this way, the output signal of the downstream side air-fuel ratio sensor 24 is used as the basis so that the rich side peak air-fuel ratio (A/F)r of the air-fuel ratio (A/F)in of the exhaust gas which flows into the exhaust purification catalyst 13 is accurately controlled to the target air-fuel ratio (A/F)b, so a high $NO_X$ purification rate can be obtained.

In this regard, when the base air-fuel ratio is maintained at the target air-fuel ratio (A/F)b and the rich side peak air-fuel ratio (A/F)r of the air-fuel ratio (A/F)in of the exhaust gas which flows into the exhaust purification catalyst 13 is accurately controlled to the target air-fuel ratio (A/F)b in this way, if an abnormality occurs in the exhaust purification system, for example, if an abnormality occurs in the hydrocarbon feed action of the hydrocarbon feed valve 15, the effect of that abnormality appears quickly in the output signal of the downstream side air-fuel ratio sensor 24. Therefore, if performing the diagnosis of the trouble for the exhaust purification system when the base air-fuel ratio is maintained at the target air-fuel ratio (A/F)b and the rich side peak air-fuel ratio (A/F)r of the air-fuel ratio (A/F)in of the exhaust gas which flows into the exhaust purification catalyst 13 is accurately controlled to the target air-fuel ratio (A/F)b in this way, it is possible to accurately find trouble in the exhaust purification system.

Therefore, in an embodiment according to the present invention, when the injection amount of hydrocarbons from the hydrocarbon feed valve 15 is controlled based on both the output signal of the upstream side air-fuel ratio sensor 23 and the output signal of the downstream side air-fuel ratio sensor 24 so that the amplitude of the change in concentration of hydrocarbons which flows into the exhaust purification catalyst 13 becomes within a predetermined range of amplitude, the output signal of the downstream side air-fuel ratio sensor 24 is used as the basis for performing the diagnosis of the trouble of the exhaust purification system.

Next, the trouble diagnosis method of the exhaust purification system will be explained with reference to the case where, as trouble of the exhaust purification system, the hydrocarbon feed valve 15 has become clogged.

Now then, if the hydrocarbon feed valve 15 becomes clogged, the feed amount of hydrocarbons from the hydrocarbon feed valve 15 is decreased. Therefore, when the base air-fuel ratio is maintained at the target air-fuel ratio (A/F)b and the rich side peak air-fuel ratio (A/F)r of the air-fuel ratio (A/F)in of the exhaust gas which flows into the exhaust purification catalyst 13 is accurately controlled to the target air-fuel ratio (A/F)b, that is, when the second embodiment of operational control I which is shown in FIG. 28 and FIG. 29 is being performed, if the hydrocarbon feed valve 15 is clogged and the feed amount of hydrocarbons from the hydrocarbon feed valve 15 is decreased, the correction coefficient K which is shown in steps 116, 118, and 119 of FIG. 29 is made to increase to make the rich side peak air-fuel ratio (A/F)r of the air-fuel ratio (A/F)in of the exhaust gas which flows into the exhaust purification catalyst 13 match the target air-fuel ratio (A/F)b.

Figure 34:
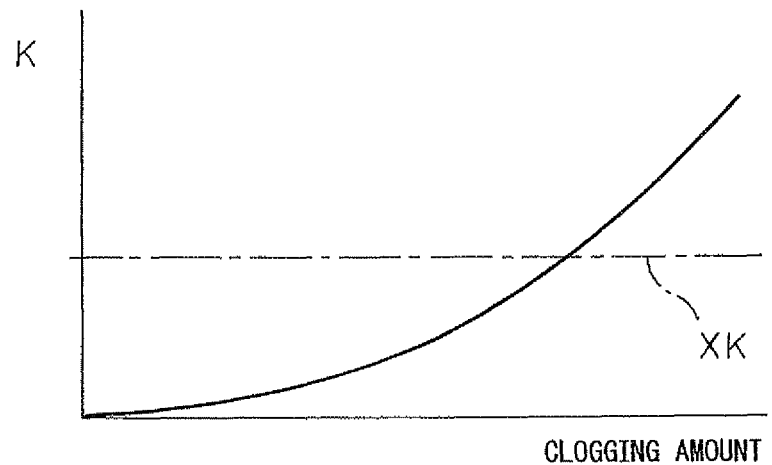
FIG. 34 is a view which shows a change in a correction coefficient K.

In this case, the more the feed amount of hydrocarbons from the hydrocarbon feed valve 15 is decreased, the more the correction coefficient K is increased. That is, as shown in FIG. 34, the more the amount of clogging of the hydrocarbon feed valve 15 is increased, the more the correction coefficient K is increased. Therefore, it is possible to judge that the hydrocarbon feed valve 15 is clogged from the value of the correction coefficient K. In an embodiment according to the present invention, the value of the correction coefficient K when the amount of clogging of the hydrocarbon feed valve 15 becomes over an allowable amount is stored as a limit value XK in advance. When the value of the correction coefficient K exceeds this limit value XK, an alarm is issued showing that the hydrocarbon feed valve 15 has become clogged.

Figure 35:
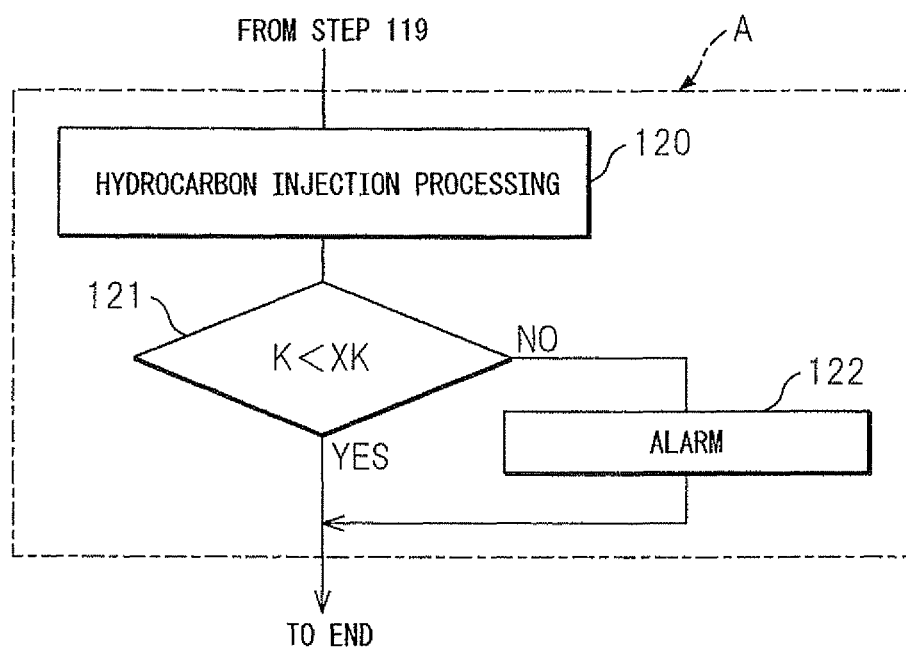
FIG. 35 is a view which shows another embodiment of a part surrounded by A in the flowcharts which are shown in FIGS. 26 and 27.

When using this trouble diagnosis method, instead of the flowchart part which is surrounded by the dot and dash line A in FIG. 29, the flowchart part which is shown in FIG. 35 is used. In this case, as shown in FIG. 35, after processing is performed for injecting hydrocarbons from the hydrocarbon feed valve 15 at step 120, it is judged at step 121 if the correction coefficient K is smaller than the limit value XK. When it is judged that K≧XK, the routine proceeds to step 122 where an alarm is issued.

Note that, the more the value of the correction coefficient K is increased, the more the injection time of hydrocarbons from the hydrocarbon feed valve 15 is made to increase. If, at this time, the correction coefficient K exceeds the limit value XK, the rate of increase of the injection time of hydrocarbons also exceeds the predetermined rate corresponding to the limit value XK. Therefore, if expressing this trouble diagnosis method by another way, when the rich side peak air-fuel ratio which is detected by the downstream side air-fuel ratio sensor 24 is at the lean side from the predetermined air-fuel ratio, the injection time of hydrocarbons is made to increase to increase the injection amount of hydrocarbons from the hydrocarbon feed valve 15. At this time, if the rate of increase of the injection time of hydrocarbons exceeds a predetermined rate, it is judged that the hydrocarbon feed valve 15 is clogged.

Next, a method of detecting abnormalities of the hydrocarbon feed valve 15, for example, clogging of the hydrocarbon feed valve 15 by calculating the injection amount of hydrocarbons from the hydrocarbon feed valve 15 from the output signal of the downstream side air-fuel ratio sensor 24 and using the thus calculated injection amount of hydrocarbons will be explained.

Figure 36A:
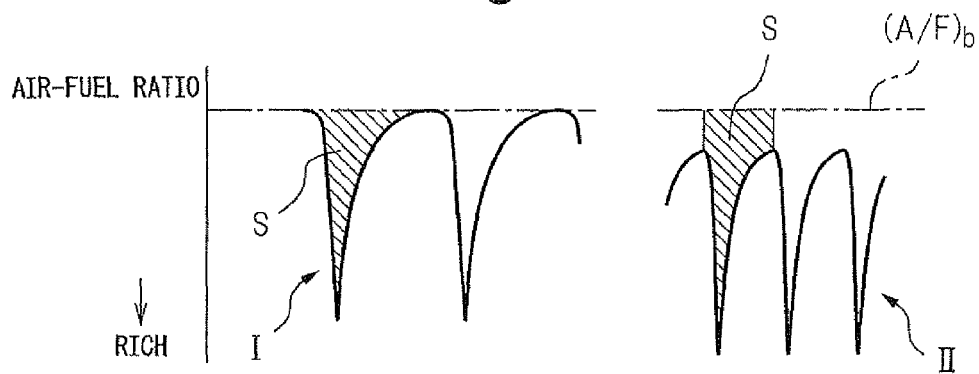
FIGS. 36A, 36B, and 36c are views which show changes in the air-fuel ratio which are detected by the downstream side air-fuel ratio sensor.

FIG. 36A shows the change in the air-fuel ratio which is detected by the downstream side air-fuel ratio sensor 24 when the $NO_X$ purification action by the first $NO_X$ purification method is being performed. At this time, the air-fuel ratio which is detected by the downstream side air-fuel ratio sensor 24 usually, as shown in I of FIG. 36, vibrates to the rich side from the base air-fuel ratio (A/F)b. That is, when the injection period of hydrocarbons from the hydrocarbon feed valve 15 is controlled so that the concentration of hydrocarbons which flow into the exhaust purification catalyst 13 vibrates by within a predetermined range of period, the air-fuel ratio which is detected by the downstream side air-fuel ratio sensor 24 usually vibrates to the rich side from the base air-fuel ratio (A/F)b.

At this time, the area S of the part which is shown by hatching, that is, the integrated value of the difference between the air-fuel ratio which is detected by the downstream side air-fuel ratio sensor 24 and the base air-fuel ratio (A/F)b, expresses the actual injection amount of hydrocarbons per injection from the hydrocarbon feed valve 15. Note that, the above-mentioned area S and integrated value show the area S and integrated value per fluctuation of the air-fuel ratio. This same is true below as well.

This area S can be calculated from the target injection amount of hydrocarbons which is calculated in accordance with the operating state of the engine. The surface area S which is calculated from the target injection amount in this way is called the reference area $S_0$. When the target injection amount and actually injected injection amount are equal, the area S becomes equal to the reference area $S_0$. However, when the target injection amount and the actually injected injection amount are not equal, the area S will not become equal to the reference area $S_0$. For example, when the actually injected injection amount is smaller compared with the target injection amount, the area S becomes smaller than the reference area $S_0$. Therefore, if comparing the area S which is calculated based on the detection signal of the downstream side air-fuel ratio sensor 24 with the reference area $S_0$ which is calculated from the target injection amount, it becomes possible to judge if hydrocarbons are being normally injected from the hydrocarbon feed valve 15.

Therefore, in an embodiment according to the present invention, it is judged if hydrocarbons are being normally injected from the hydrocarbon feed valve 15, for example, if the hydrocarbon feed valve 15 is clogged on the basis of the integrated value of the difference between the air-fuel ratio detected by the downstream side air-fuel ratio sensor 24 and the base air-fuel ratio (A/F)b. In this case, in a specific example according to the present invention, when the area S becomes smaller than the reference area So multiplied with a constant value C (<1.0), that is, the value C·So, it is judged that the hydrocarbon feed valve 15 is clogged.

In this regard, if the injection period of hydrocarbons from the hydrocarbon feed valve 15 becomes short, as shown in II of FIG. 36A, the air-fuel ratio which is detected by the downstream side air-fuel ratio sensor 24 changes toward the rich side before returning to the base air-fuel ratio (A/F)b due to the next injection action of hydrocarbons. If the air-fuel ratio which is detected by the downstream side air-fuel ratio sensor 24 no longer returns to the base air-fuel ratio (A/F)b in this way, the calculated surface area S no longer will express the actual hydrocarbon injection amount.

Figure 36B:
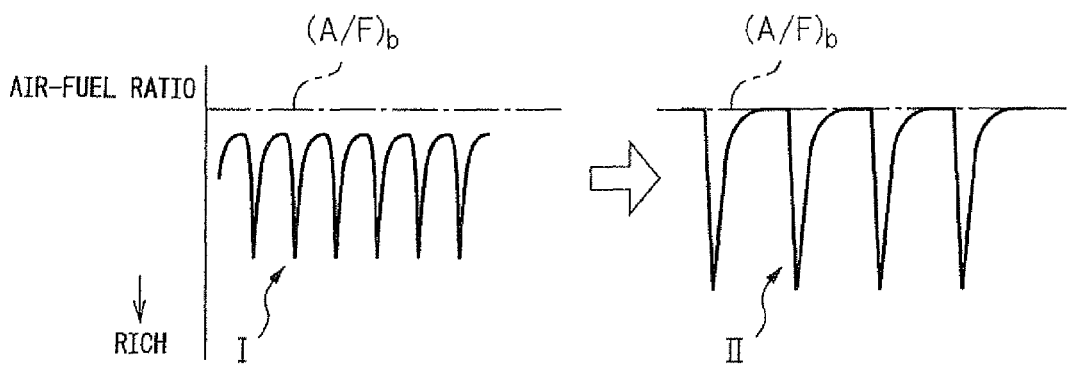

Therefore, in an embodiment according to the present invention, as shown in I of FIG. 36B, when the air-fuel ratio which is detected by the downstream side air-fuel ratio sensor 24 no longer returns to the base air-fuel ratio (A/F)b, the air-fuel ratio which is detected by the downstream side air-fuel ratio sensor 24 is made to return to the base air-fuel ratio (A/F)b by, as shown by II in FIG. 36B, lengthening the injection period of hydrocarbons from the hydrocarbon feed valve 15.

That is, in the embodiment according to the present invention, when using the integrated value of the difference between the air-fuel ratio detected by the downstream side air-fuel ratio sensor 24 and the base air-fuel ratio (A/F)b as the basis to judge if the hydrocarbon feed valve 15 is clogged, if the injection period of hydrocarbons is too short for accurately detecting the injection amount of hydrocarbons from the hydrocarbon feed valve 15, the injection period of hydrocarbons is made longer. Further, in this case, the amount of hydrocarbons which is supplied is prevented from becoming insufficient by increasing the injection amount of hydrocarbons per injection from the hydrocarbon feed valve 15.

Figure 36C:
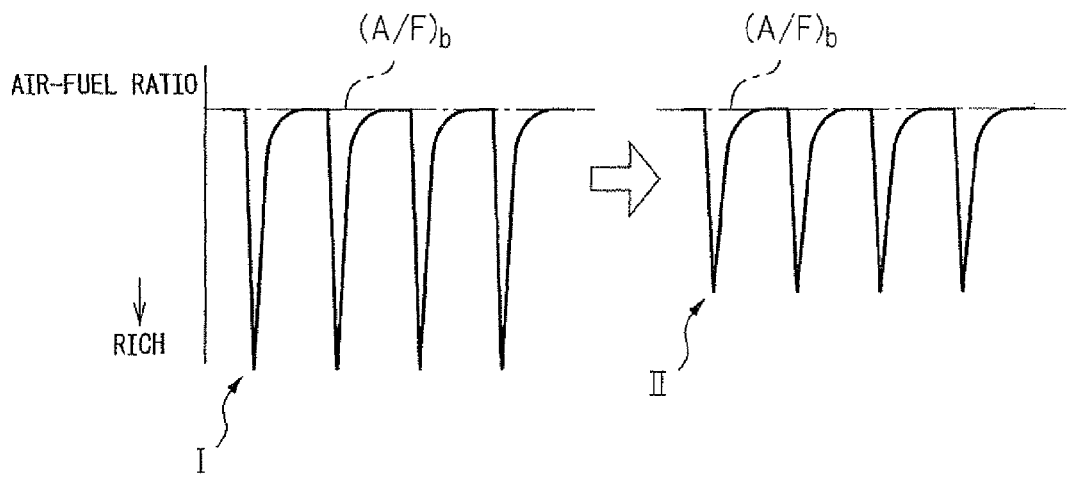

On the other hand, as shown by I in FIG. 36C, if the injection amount of hydrocarbons per injection from the hydrocarbon feed valve 15 becomes larger, part of the hydrocarbons passes straight through the exhaust purification catalyst 13. However, if hydrocarbons pass straight through the exhaust purification catalyst 13 in this way, the problem arises that the hydrocarbons which pass straight through cause the air-fuel ratio detected by the downstream side air-fuel ratio sensor 24 to deviate to the lean side. That is, in the air-fuel ratio sensor, the air-fuel ratio is detected from the amount of excessive or insufficient oxygen when the hydrocarbons and oxygen in the exhaust gas are made to react on the air-fuel ratio sensor. However, the hydrocarbons passed through are large in molecular weight, so will not react on the air-fuel ratio sensor. As a result, it will be judged that the amount of oxygen is present in a larger amount than the actual amount of oxygen and thereby the air-fuel ratio which is detected by the downstream side air-fuel ratio sensor 24 deviates to the lean side.

If the air-fuel ratio which is detected by the downstream side air-fuel ratio sensor 24 deviates to the lean side in this way, the injection amount of hydrocarbons from the hydrocarbon feed valve 15 can no longer be accurately detected. Therefore, in the embodiment according to the present invention, as shown by I in FIG. 36C, to prevent hydrocarbons from passing straight through the exhaust purification catalyst 13 when the injection amount of hydrocarbons per injection from the hydrocarbon feed valve 15 is large, as shown by II in FIG. 36C, the injection amount of hydrocarbons per injection from the hydrocarbon feed valve 15 is reduced.

That is, in the embodiment according to the present invention, when using the integrated value of the difference between the air-fuel ratio detected by the downstream side air-fuel ratio sensor 24 and the base air-fuel ratio (A/F)b as the basis to judge if the hydrocarbon feed valve 15 is clogged, if the injection amount of hydrocarbons becomes too great for accurately detecting the injection amount of hydrocarbons from the hydrocarbon feed valve 15, the injection amount of hydrocarbons is made smaller.

Figure 37:
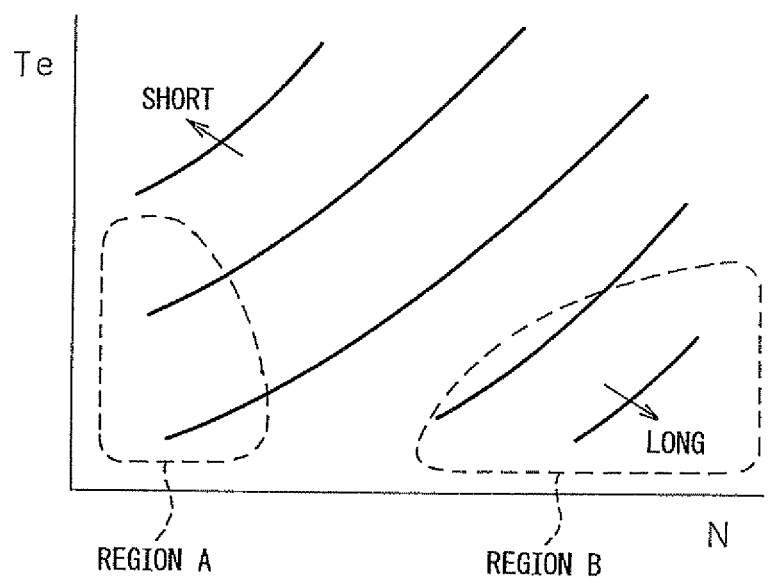
FIG. 37 is a view which shows predetermined regions A and B.

Note that, as shown by I in FIG. 36B, there is a possibility that the air-fuel ratio which is detected by the downstream side air-fuel ratio sensor 24 does not return to the base air-fuel ratio (A/F)b at the time of engine low speed, low or medium load operation which is shown by the region A of FIG. 37. Therefore, in a specific example according to the present invention, when the operating state of the engine is the engine low speed, low or medium load operating state which is shown by the region A, as shown by II in FIG. 36B, the injection period of hydrocarbons from the hydrocarbon feed valve 15 is made longer and the injection amount of hydrocarbons per injection is increased.

On the other hand, as shown by I in FIG. 36C, there is a possibility of the injection amount of hydrocarbons per injection from the hydrocarbon feed valve 15 becoming larger at the time of engine high speed, low load operation which is shown by the region B of FIG. 37. Therefore, in a specific example of the present invention, when the operating state of the engine is the engine high speed, low load operating state which is shown by the region B, as shown by II in FIG. 36C, the injection amount of hydrocarbons per injection from the hydrocarbon feed valve 15 is reduced.

Figure 38:
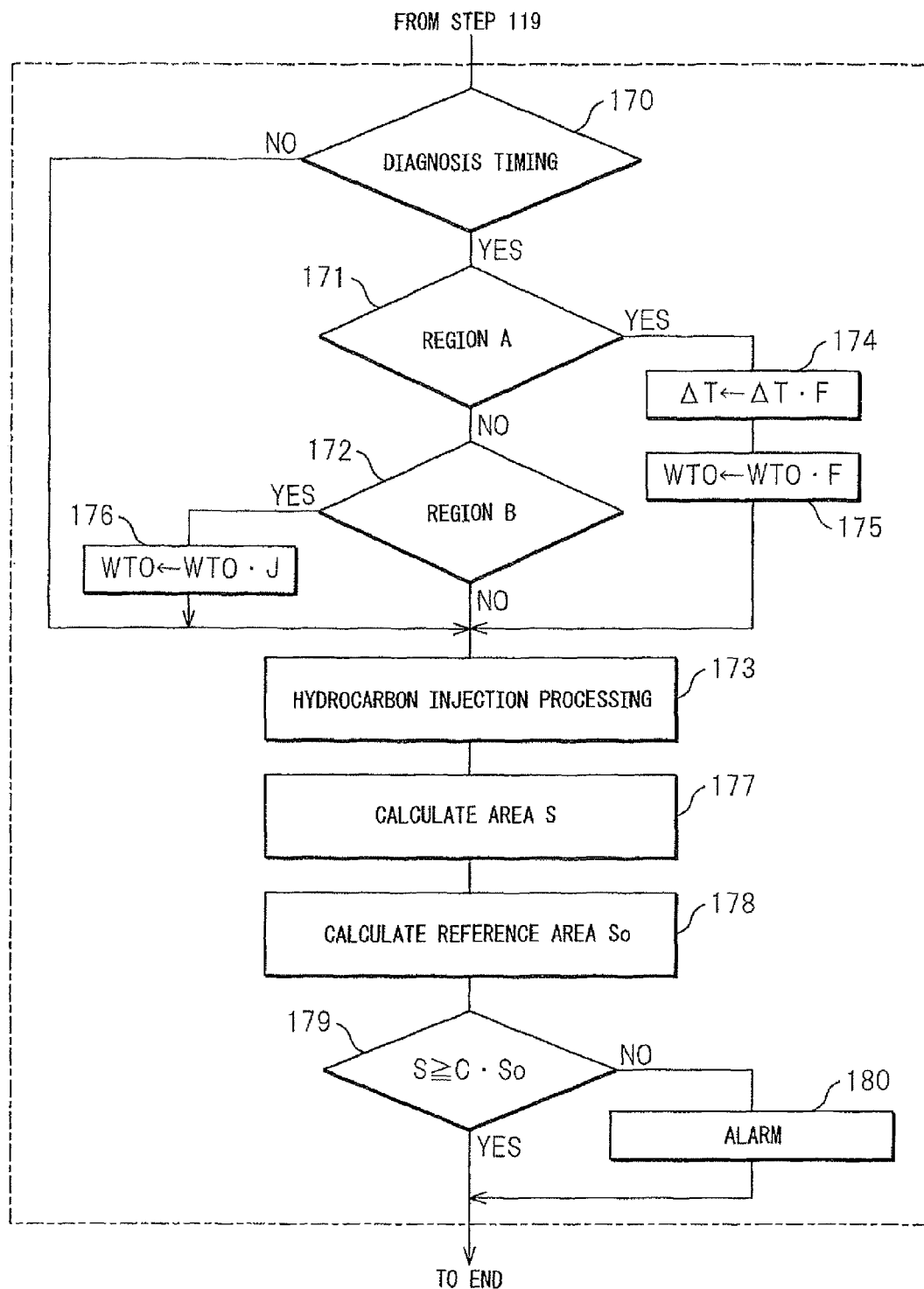
FIG. 38 is a view which shows still another embodiment of a part which is surrounded by A in the flowcharts which are shown in FIGS. 26 and 27.

When using the trouble diagnosis method which was explained based on FIGS. 36A, 36B, and 36C and FIG. 37, instead of the flowchart part which is surrounded by the dot and dash line A in FIG. 29, the flowchart part which is shown in FIG. 38 is used. In this case, as shown in FIG. 38, first, at step 170, it is judged if the timing is one for trouble diagnosis. When not the timing for trouble diagnosis, the routine proceeds to step 173 where processing is performed for injecting hydrocarbons from the hydrocarbon feed valve 15. As opposed to this, when the timing is one for trouble diagnosis, the routine proceeds to step 171 where it is judged if the operating state of the engine is in the operating region A which is shown in FIG. 37. When the operating state of the engine is not in the operating region A which is shown in FIG. 37, the routine proceeds to step 172 where it is judged if the operating state of the engine is in the operating region B which is shown in FIG. 37. When the operating state of the engine is not in the operating region B which is shown in FIG. 37, the routine proceeds to step 173.

On the other hand, when it is judged at step 171 that the operating state of the engine is in the operating region A which is shown in FIG. 37, the routine proceeds to step 174 where the injection period of hydrocarbons ΔT from the hydrocarbon feed valve 15 is multiplied with a predetermined correction value F (>1.0). Next, at step 175, the hydrocarbon injection period WTO from the hydrocarbon feed valve 15 which was calculated at step 119 of FIG. 29 is multiplied with the correction value F. Next, the routine proceeds to step 173. At this time, the injection period of hydrocarbons from the hydrocarbon feed valve 15 is lengthened and the injection amount of hydrocarbons per injection is increased.

Further, when, at step 172, it is judged that the operating state of the engine is the operating region B which is shown in FIG. 37, the routine proceeds to step 176 where the hydrocarbon injection period WTO from the hydrocarbon feed valve 15 which was calculated at step 119 of FIG. 29 is multiplied with a correction value J (<1.0). Next, the routine proceeds to step 173. At this time, the injection amount of hydrocarbons each injection from the hydrocarbon feed valve 15 is made to decrease.

Next, at step 177, the integral value of the difference between the air-fuel ratio detected by the downstream side air-fuel ratio sensor 24 and the base air-fuel ratio $(A/F)_b$, that is, the area S per fluctuation of the air-fuel ratio which is shown in FIG. 36A, is calculated. Next, at step 178, the reference area $S_0$ is calculated from the target injection amount of hydrocarbons. Next, at step 179, it is judged if the area S is larger than the reference area $S_0$ multiplied with the constant value C (<1.0), that is, the value $C \cdot S_0$. When $S < C \cdot S_0$, it is judged that the hydrocarbon feed valve 15 is clogged, then the routine proceeds to step 180 where an alarm is issued.

Note that, as another embodiment, in the engine exhaust passage upstream of the exhaust purification catalyst 13, an oxidation catalyst for reforming the hydrocarbons can be arranged.

Reference Signs List
   4 . . . intake manifold
   5 . . . exhaust manifold
   7 . . . exhaust turbocharger
   12, 12a . . . exhaust pipe
   13 . . . exhaust purification catalyst
   14 . . . particulate filter
   15 . . . hydrocarbon feed valve

The invention claimed is:
1. An exhaust purification system of an internal combustion engine comprising:
   a hydrocarbon feed valve for feeding hydrocarbons arranged in an engine exhaust passage,
   an exhaust purification catalyst for reacting $NO_X$ contained in exhaust gas and reformed hydrocarbons arranged in the engine exhaust passage downstream of the hydrocarbon feed valve, a downstream side air-fuel ratio sensor for detecting an air-fuel ratio of the exhaust gas arranged in the engine exhaust passage downstream of the exhaust purification catalyst, precious metal catalysts carried on an exhaust gas flow surface of the exhaust purification catalyst, a basic exhaust gas flow surface part formed around the precious metal catalysts, and an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein when the electronic control unit controls the vibration of the concentration of hydrocarbons flowing into the exhaust purification catalyst within the predetermined range of amplitude and within the predetermined range of period, a reducing intermediate containing nitrogen and hydrocarbons is produced on the precious metal catalysts and held on the basic exhaust gas flow surface part, the $NO_X$ contained in the exhaust gas is chemically reduced by the reducing intermediate held on the basic exhaust gas flow surface part, and the exhaust purification catalyst has a property of chemically reducing the $NO_X$ that is contained in the exhaust gas without storing, or with storing a fine amount of, nitrates in the basic exhaust gas flow surface part, when the electronic control unit controls the vibration period of the hydrocarbon concentration longer than the predetermined range, the exhaust purification catalyst has a property of being increased in a storage amount of $NO_X$ that is contained in the exhaust gas and the concentration of hydrocarbons that flow into the exhaust purification catalyst is made to vibrate within the predetermined range of period by control of an injection period of hydrocarbons from the hydrocarbon feed valve, and the amplitude of a change of concentration of hydrocarbons that flow into the exhaust purification catalyst is made to become within the predetermined range of amplitude by control of an injection amount of hydrocarbons from the hydrocarbon feed valve based on an output signal of the downstream side air-fuel ratio sensor.

2. The exhaust purification system of the internal combustion engine as claimed in claim 1, wherein in the exhaust purification catalyst, $NO_X$ contained in exhaust gas and reformed hydrocarbons react to produce the reducing intermediate containing nitrogen and hydrocarbons, and wherein the injection period of the hydrocarbons is a period necessary for continued production of the reducing intermediate.

3. The exhaust purification system of the internal combustion engine as claimed in claim 1, wherein the precious metal catalysts are comprised of platinum (Pt) and at least one of rhodium (Rh) or palladium (Pd).

4. The exhaust purification system of the internal combustion engine as claimed in claim 1, wherein a basic layer containing an alkali metal, an alkali earth metal, a rare earth, or a metal that donates electrons to $NO_X$ is formed on the exhaust gas flow surface of the exhaust purification catalyst and wherein a surface of the basic layer forms the basic exhaust gas flow surface part.

5. The exhaust purification system of the internal combustion engine as claimed in claim 1, wherein when the injection period of hydrocarbons from the hydrocarbon feed valve is controlled so that the concentration of hydrocarbons that flow into the exhaust purification catalyst vibrates within the predetermined range of period, the air-fuel ratio that is detected by the downstream side air-fuel ratio sensor also vibrates, and when a rich side peak air-fuel ratio that is detected by the downstream side air-fuel ratio sensor is at a lean side from a predetermined air-fuel ratio, the injection amount of hydrocarbons from the hydrocarbon feed valve is increased, while when the rich side peak air-fuel ratio that is detected by the downstream side air-fuel ratio sensor is at a rich side from the predetermined air-fuel ratio, the injection amount of hydrocarbons from the hydrocarbon feed valve is decreased.

6. The exhaust purification system of the internal combustion engine as claimed in claim 1, wherein further comprising an upstream air-fuel ratio sensor for detecting the air-fuel ratio of the exhaust gas arranged in the engine exhaust passage upstream of the hydrocarbon feed valve, wherein the injection amount of hydrocarbons from the hydrocarbon feed valve is controlled so that the amplitude of the change in concentration of hydrocarbons that flow into the exhaust purification catalyst become within the predetermined range of amplitude on the basis of both an output signal of the upstream side air-fuel ratio sensor and the output signal of the downstream side air-fuel ratio sensor.

7. The exhaust purification system of the internal combustion engine as claimed in claim 6 wherein when the injection period of hydrocarbons from the hydrocarbon feed valve is controlled so that the concentration of hydrocarbons that flow into the exhaust purification catalyst is made to vibrate within the predetermined range of period, the air-fuel ratio that is detected by the downstream side air-fuel ratio sensor also vibrates, when the air-fuel ratio that is detected by the upstream side air-fuel ratio sensor is at a lean side from a predetermined air-fuel ratio, the injection amount of hydrocarbons from the hydrocarbon feed valve is increased, while when the air-fuel ratio that is detected by the upstream side air-fuel ratio sensor is at a rich side from the predetermined air-fuel ratio, the injection amount of hydrocarbons from the hydrocarbon feed valve is decreased, and when a rich side peak air-fuel ratio that is detected by the downstream side air-fuel ratio sensor is at a lean side from a predetermined air-fuel ratio, the injection amount of hydrocarbons from the hydrocarbon feed valve is increased, while when the rich side peak air-fuel ratio that is detected by the downstream side air-fuel ratio sensor is at a rich side from the predetermined air-fuel ratio, the injection amount of hydrocarbons from the hydrocarbon feed valve is decreased.

8. The exhaust purification system of the internal combustion engine as claimed in claim 6, wherein an amount of fuel that is fed into an engine combustion chamber is controlled based on the output signal of the upstream side air-fuel ratio sensor so that the air-fuel ratio of the exhaust gas which is exhausted from the engine is made to become a predetermined air-fuel ratio.

9. The exhaust purification system of the internal combustion engine as claimed in claim 8, wherein when the injection amount of hydrocarbons from the hydrocarbon feed valve is controlled based on both the output signal of the upstream side air-fuel ratio sensor and the output signal of the downstream side air-fuel ratio sensor so that the amplitude of the change in concentration of hydrocarbons that flow into the exhaust purification catalyst becomes within the predetermined range of amplitude of the air-fuel ratio, a diagnosis of trouble of the exhaust purification system is performed based on the output signal of the downstream side air-fuel ratio sensor.

10. The exhaust purification system of the internal combustion engine as claimed in claim 9, wherein when the injection period of hydrocarbons from the hydrocarbon feed valve is controlled so that the concentration of hydrocarbons that flow into the exhaust purification catalyst vibrates within the predetermined range of period, the air-fuel ratio that is detected by the downstream side air-fuel ratio sensor also vibrates, when a rich side peak air-fuel ratio that is detected by the downstream side air-fuel ratio sensor becomes a lean side from a predetermined air-fuel ratio, an injection time of hydrocarbons is made to increase in order to increase the injection amount of hydrocarbons from the hydrocarbon feed valve, and when a rate of increase of the injection time of hydrocarbons exceeds a predetermined rate at this time, the electronic control unit determines that the hydrocarbon feed valve is clogged.

11. The exhaust purification system of the internal combustion engine as claimed in claim 10, wherein when the injection period of hydrocarbons from the hydrocarbon feed valve is controlled so that the concentration of hydrocarbons that flow into the exhaust purification catalyst vibrate within the predetermined range of period, the air-fuel ratio that is detected by the downstream side air-fuel ratio sensor vibrates to a rich side from a base air-fuel ratio, and the electronic control unit determines if the hydrocarbon feed valve is clogged based on an integrated value of a difference between the air-fuel ratio detected by the downstream side air-fuel ratio sensor and the base air-fuel ratio.

12. The exhaust purification system of the internal combustion engine as claimed in claim 11, wherein when using the integrated value of the difference between the air-fuel ratio detected by the downstream side air-fuel ratio sensor and the base air-fuel ratio as the basis to judge if the hydrocarbon feed valve is clogged, the injection amount of hydrocarbons is made smaller when the injection amount of hydrocarbons is too large to accurately detect the injection amount of hydrocarbons from the hydrocarbon feed valve.

13. The exhaust purification system of the internal combustion engine as claimed in claim 11 wherein when using the integrated value of the difference between the air-fuel ratio detected by the downstream side air-fuel ratio sensor and the base air-fuel ratio as the basis to judge if the hydrocarbon feed valve is clogged, the injection period of hydrocarbons is made longer when the injection period of hydrocarbons is too short to accurately detect the injection amount of hydrocarbons from the hydrocarbon feed valve.

14. The exhaust purification system of the internal combustion engine as claimed in claim 13, wherein the injection period of the hydrocarbons is 0.3 second to 5 seconds.

* * * * *